US010672399B2

(12) United States Patent
Cannistraro et al.

(10) Patent No.: US 10,672,399 B2
(45) Date of Patent: Jun. 2, 2020

(54) SWITCHING BETWEEN TEXT DATA AND AUDIO DATA BASED ON A MAPPING

(75) Inventors: Alan C. Cannistraro, San Francisco, CA (US); Gregory S. Robbin, Mountain View, CA (US); Casey M. Dougherty, San Francisco, CA (US); Raymond Walsh, San Jose, CA (US); Melissa Breglio Hajj, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 1317 days.

(21) Appl. No.: 13/267,749

(22) Filed: Oct. 6, 2011

(65) Prior Publication Data

US 2012/0310649 A1  Dec. 6, 2012

Related U.S. Application Data

(60) Provisional application No. 61/493,372, filed on Jun. 3, 2011, provisional application No. 61/494,375, filed on Jun. 7, 2011.

(51) Int. Cl.
*G10L 15/00* (2013.01)
*G10L 15/26* (2006.01)
(Continued)

(52) U.S. Cl.
CPC ............ *G10L 15/26* (2013.01); *G06F 16/685* (2019.01); *G06F 40/169* (2020.01); *G10L 13/00* (2013.01); *G10L 15/19* (2013.01)

(58) Field of Classification Search
CPC ......... G10L 13/00; G10L 15/19; G10L 15/26; G10L 21/00; G10L 21/06; G10L 12/265; G06F 17/241; G06F 17/30746
(Continued)

(56) References Cited

U.S. PATENT DOCUMENTS 3,704,345 A  11/1972  Coker et al.
3,828,132 A  8/1974  Flanagan et al.
(Continued)

FOREIGN PATENT DOCUMENTS

CH  681573 A5  4/1993
DE  3837590 A1  5/1990
(Continued)

OTHER PUBLICATIONS

Acero, A., et al., "Environmental Robustness in Automatic Speech Recognition," International Conference on Acoustics, Speech, and Signal Processing (ICASSP'90), Apr. 3-6, 1990, 4 pages.
(Continued)

*Primary Examiner* — Olujimi A Adesanya
(74) *Attorney, Agent, or Firm* — Dentons US LLP

(57) ABSTRACT

Techniques are provided for creating a mapping that maps locations in audio data (e.g., an audio book) to corresponding locations in text data (e.g., an e-book). Techniques are provided for using a mapping between audio data and text data, whether the mapping is created automatically or manually. A mapping may be used for bookmark switching where a bookmark established in one version of a digital work (e.g., e-book) is used to identify a corresponding location with another version of the digital work (e.g., an audio book). Alternatively, the mapping may be used to play audio that corresponds to text selected by a user. Alternatively, the mapping may be used to automatically highlight text in response to audio that corresponds to the text being played. Alternatively, the mapping may be used to determine where an annotation created in one media context (e.g., audio) will be consumed in another media context.

16 Claims, 11 Drawing Sheets

(51) Int. Cl.
  *G10L 13/08* (2013.01)
  *G10L 21/00* (2013.01)
  *G10L 25/00* (2013.01)
  *G10L 13/00* (2006.01)
  *G10L 15/19* (2013.01)
  *G06F 16/683* (2019.01)
  *G06F 40/169* (2020.01)

(58) Field of Classification Search
  USPC .................................. 704/235, 270, 270.1
  See application file for complete search history.

(56) References Cited

U.S. PATENT DOCUMENTS

| | | |
|---|---|---|
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,829,583 A | 5/1989 | Monroe et al. |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Bianco |
| 5,057,915 A | 10/1991 | Kohorn et al. |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,627 A | 1/1993 | Sweet et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| 5,289,562 A | 2/1994 | Mizuta et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lenning et al. |
| 5,491,772 A | 2/1996 | Hardwick et al. |
| 5,493,677 A | 2/1996 | Balogh |
| 5,495,604 A | 2/1996 | Harding et al. |
| 5,500,905 A | 3/1996 | Martin et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,555,343 A | 9/1996 | Luther |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,649,060 A * | 7/1997 | Ellozy et al. ............... 704/278 |
| 5,664,055 A | 9/1997 | Kroon |
| 5,675,819 A | 10/1997 | Schuetze |

(56) References Cited

U.S. PATENT DOCUMENTS

| | | |
|---|---|---|
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,734,791 A | 3/1998 | Acero et al. |
| 5,737,734 A | 4/1998 | Schultz |
| 5,742,705 A | 4/1998 | Parthasarathy |
| 5,748,974 A | 5/1998 | Johnson |
| 5,749,081 A | 5/1998 | Whiteis |
| 5,757,979 A | 5/1998 | Hongo et al. |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |
| 5,812,697 A | 9/1998 | Sakai et al. |
| 5,812,698 A | 9/1998 | Platt et al. |
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Walker et al. |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,909,666 A | 6/1999 | Gould et al. |
| 5,913,193 A | 6/1999 | Huang et al. |
| 5,915,236 A | 6/1999 | Gould et al. |
| 5,915,249 A | 6/1999 | Spencer |
| 5,920,836 A | 7/1999 | Gould et al. |
| 5,920,837 A | 7/1999 | Gould et al. |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | LeRoy et al. |
| 5,974,146 A | 10/1999 | Randle et al. |
| 5,982,891 A | 11/1999 | Ginter et al. |
| 5,983,179 A | 11/1999 | Gould |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,991,441 A | 11/1999 | Jourjine |
| 5,999,908 A | 12/1999 | Abelow |
| 6,016,471 A | 1/2000 | Kuhn et al. |
| 6,017,219 A | 1/2000 | Adams, Jr. et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,959 A | 5/2000 | Young et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,073,097 A | 6/2000 | Gould et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,081,780 A | 6/2000 | Lumelsky |
| 6,094,649 A | 6/2000 | Bowen et al. |
| 6,088,731 A | 7/2000 | Kiraly et al. |
| 6,092,043 A | 7/2000 | Squires et al. |
| 6,101,468 A | 8/2000 | Gould et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,177,905 B1 | 1/2001 | Welch |
| 6,188,999 B1 | 2/2001 | Moody |
| 6,195,641 B1 | 2/2001 | Loring et al. |
| 6,199,076 B1 * | 3/2001 | Logan ............... G06F 17/30053 434/319 |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,259,826 B1 | 7/2001 | Pollard et al. |
| 6,260,011 B1 * | 7/2001 | Heckerman et al. ......... 704/235 |
| 6,260,013 B1 | 7/2001 | Sejnoha |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,282,507 B1 | 8/2001 | Horiguchi et al. |
| 6,282,511 B1 | 8/2001 | Mayer |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Belllegarda et al. |
| 6,397,186 B1 | 5/2002 | Bush et al. |
| 6,421,672 B1 | 7/2002 | McAllister et al. |
| 6,434,522 B1 | 8/2002 | Tsuboka |
| 6,434,524 B1 | 8/2002 | Weber |
| 6,442,518 B1 * | 8/2002 | Van Thong et al. .......... 704/235 |
| 6,446,076 B1 | 9/2002 | Burkey et al. |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |

(56) References Cited

U.S. PATENT DOCUMENTS

| | | |
|---|---|---|
| 6,489,951 B1 | 12/2002 | Wong et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,519,565 B1 | 2/2003 | Clements et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,022 B2 | 7/2003 | Yuschik |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,622,121 B1 | 9/2003 | Crepy et al. |
| 6,622,136 B2 | 9/2003 | Russell |
| 6,625,583 B1 | 9/2003 | Silverman et al. |
| 6,628,808 B1 | 9/2003 | Bach et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,680,675 B1 | 1/2004 | Suzuki |
| 6,684,187 B1 | 1/2004 | Conkie |
| 6,691,064 B2 | 2/2004 | Vroman |
| 6,691,090 B1 | 2/2004 | Laurila et al. |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Want et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,839,464 B2 | 1/2005 | Hawkins et al. |
| 6,839,669 B1 | 1/2005 | Gould et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,865,533 B2 | 3/2005 | Addison et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,498 B2 | 6/2005 | Stevens et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,934,684 B2 | 8/2005 | Alpdemir et al. |
| 6,937,975 B1 | 8/2005 | Elworthy |
| 6,937,986 B2 | 8/2005 | Denenberg et al. |
| 6,957,076 B2 | 10/2005 | Hunzinger |
| 6,960,734 B1 | 11/2005 | Park |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,024,363 B1 | 4/2006 | Comerford et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,084,758 B1 | 8/2006 | Cole |
| 7,085,723 B2 | 8/2006 | Ross et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,107,204 B1 | 9/2006 | Liu et al. |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,228,278 B2 | 6/2007 | Nguyen et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,269,556 B2 | 9/2007 | Kiss et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,315,818 B2 | 1/2008 | Stevens et al. |
| 7,324,947 B2 | 1/2008 | Jordan et al. |
| 7,349,953 B2 | 3/2008 | Lisitsa et al. |
| 7,362,738 B2 | 4/2008 | Taube et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,460,652 B2 | 12/2008 | Chang |
| 7,467,087 B1 | 12/2008 | Gillick et al. |
| 7,475,010 B2 | 1/2009 | Chao |
| 7,483,832 B2 | 1/2009 | Tischer |

(56) References Cited

U.S. PATENT DOCUMENTS

| | | |
|---|---|---|
| 7,483,894 B2 | 1/2009 | Cao |
| 7,487,089 B2 | 2/2009 | Mozer |
| 7,490,039 B1 | 2/2009 | Shaffer et al. |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,528,713 B2 | 5/2009 | Singh et al. |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,571,106 B2 | 8/2009 | Cao et al. |
| 7,577,522 B2 | 8/2009 | Rosenberg |
| 7,580,551 B1 | 8/2009 | Srihari et al. |
| 7,599,918 B2 | 10/2009 | Shen et al. |
| 7,603,381 B2 | 10/2009 | Burke et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,649,454 B2 | 1/2010 | Singh et al. |
| 7,657,424 B2 | 2/2010 | Bennett |
| 7,664,638 B2 | 2/2010 | Cooper et al. |
| 7,672,841 B2 | 3/2010 | Bennett |
| 7,676,026 B1 | 3/2010 | Baxter, Jr. |
| 7,684,985 B2 | 3/2010 | Dominach et al. |
| 7,684,990 B2 | 3/2010 | Caskey et al. |
| 7,693,715 B2 | 4/2010 | Hwang et al. |
| 7,693,719 B2 | 4/2010 | Chu et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,721,301 B2 | 5/2010 | Wong et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Levi et al. |
| 7,840,447 B2 | 11/2010 | Kleinrock et al. |
| 7,853,574 B2 | 12/2010 | Kraenzel et al. |
| 7,853,664 B1 | 12/2010 | Wang et al. |
| 7,873,519 B2 | 1/2011 | Bennett |
| 7,873,654 B2 | 1/2011 | Bernard |
| 7,881,936 B2 | 2/2011 | Longé et al. |
| 7,885,844 B1 | 2/2011 | Cohen et al. |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,930,197 B2 | 4/2011 | Ozzie et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 7,999,669 B2 | 8/2011 | Singh et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,032,383 B1 | 10/2011 | Bhardwaj et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,050,500 B1 | 11/2011 | Batty et al. |
| 8,055,708 B2 | 11/2011 | Chitsaz et al. |
| 8,065,155 B1 | 11/2011 | Gazdzinski |
| 8,065,156 B2 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longé et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,138,912 B2 | 3/2012 | Singh et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,188,856 B2 | 5/2012 | Singh et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,777 B1 * | 10/2012 | Nguyen et al. ............... 704/270 |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,383 B2 | 10/2012 | Lindahl |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 8,484,027 B1 * | 7/2013 | Murphy ............... G09B 5/06 704/258 |
| 8,498,857 B2 | 7/2013 | Kopparapu et al. |
| 8,861,925 B1 | 10/2014 | Ohme |
| 2001/0047264 A1 | 11/2001 | Roundtree |
| 2002/0010584 A1 | 1/2002 | Schultz et al. |
| 2002/0031262 A1 | 3/2002 | Imagawa et al. |
| 2002/0032564 A1 | 3/2002 | Ehsani et al. |
| 2002/0035474 A1 | 3/2002 | Alpdemir |

(56) References Cited

U.S. PATENT DOCUMENTS

| | | |
|---|---|---|
| 2002/0042707 A1 | 4/2002 | Zhao et al. |
| 2002/0046025 A1 | 4/2002 | Hain |
| 2002/0057293 A1* | 5/2002 | Liao .................. G06F 3/04883 715/781 |
| 2002/0059068 A1 | 5/2002 | Rose et al. |
| 2002/0067308 A1 | 6/2002 | Robertson |
| 2002/0069063 A1 | 6/2002 | Buchner et al. |
| 2002/0077817 A1 | 6/2002 | Atal |
| 2002/0095290 A1 | 7/2002 | Kahn et al. |
| 2002/0099552 A1* | 7/2002 | Rubin et al. .................. 704/270 |
| 2002/0103641 A1 | 8/2002 | Kuo et al. |
| 2002/0116171 A1 | 8/2002 | Russell |
| 2002/0116185 A1 | 8/2002 | Cooper et al. |
| 2002/0116189 A1 | 8/2002 | Yeh et al. |
| 2002/0128827 A1 | 9/2002 | Bu et al. |
| 2002/0129057 A1 | 9/2002 | Spielberg |
| 2002/0133347 A1 | 9/2002 | Schoneburg et al. |
| 2002/0135565 A1 | 9/2002 | Gordon et al. |
| 2002/0138265 A1 | 9/2002 | Stevens et al. |
| 2002/0143551 A1 | 10/2002 | Sharma et al. |
| 2002/0154160 A1 | 10/2002 | Hosokawa |
| 2002/0164000 A1 | 11/2002 | Cohen et al. |
| 2002/0184189 A1* | 12/2002 | Hay et al. .......................... 707/1 |
| 2002/0198714 A1 | 12/2002 | Zhou |
| 2003/0078766 A1 | 4/2003 | Appelt et al. |
| 2003/0088414 A1 | 5/2003 | Huang et al. |
| 2003/0097210 A1 | 5/2003 | Horst et al. |
| 2003/0099335 A1 | 5/2003 | Tanaka et al. |
| 2003/0135740 A1 | 7/2003 | Talmor et al. |
| 2003/0167335 A1 | 9/2003 | Alexander |
| 2003/0190074 A1 | 10/2003 | Loudon et al. |
| 2003/0233230 A1 | 12/2003 | Ammicht et al. |
| 2003/0234824 A1 | 12/2003 | Litwiller |
| 2004/0054530 A1 | 3/2004 | Davis et al. |
| 2004/0085162 A1 | 5/2004 | Agarwal et al. |
| 2004/0135701 A1 | 7/2004 | Yasuda et al. |
| 2004/0145607 A1 | 7/2004 | Alderson |
| 2004/0186714 A1 | 9/2004 | Baker |
| 2004/0199387 A1 | 10/2004 | Wang et al. |
| 2004/0216049 A1 | 10/2004 | Lewis et al. |
| 2004/0220798 A1 | 11/2004 | Chi et al. |
| 2004/0236778 A1 | 11/2004 | Junqua et al. |
| 2005/0002507 A1 | 1/2005 | Timmins et al. |
| 2005/0010409 A1 | 1/2005 | Hull et al. |
| 2005/0015772 A1 | 1/2005 | Saare et al. |
| 2005/0033582 A1 | 2/2005 | Gadd et al. |
| 2005/0045373 A1 | 3/2005 | Born |
| 2005/0049880 A1 | 3/2005 | Roth et al. |
| 2005/0055403 A1 | 3/2005 | Brittan |
| 2005/0058438 A1 | 3/2005 | Hayashi |
| 2005/0071332 A1 | 3/2005 | Ortega et al. |
| 2005/0080625 A1 | 4/2005 | Bennett et al. |
| 2005/0086059 A1 | 4/2005 | Bennett |
| 2005/0091118 A1 | 4/2005 | Fano |
| 2005/0100214 A1 | 5/2005 | Zhang et al. |
| 2005/0102614 A1 | 5/2005 | Brockett et al. |
| 2005/0108001 A1 | 5/2005 | Aarskog |
| 2005/0108074 A1 | 5/2005 | Bloechl et al. |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0152602 A1 | 7/2005 | Chen et al. |
| 2005/0165607 A1 | 7/2005 | DiFabbrizio et al. |
| 2005/0182628 A1 | 8/2005 | Choi |
| 2005/0182629 A1 | 8/2005 | Coorman et al. |
| 2005/0192801 A1 | 9/2005 | Lewis et al. |
| 2005/0192812 A1 | 9/2005 | Buchholz et al. |
| 2005/0196733 A1 | 9/2005 | Budra et al. |
| 2005/0203747 A1 | 9/2005 | Lecoeuche |
| 2005/0203991 A1 | 9/2005 | Kawamura et al. |
| 2005/0228665 A1 | 10/2005 | Kobayashi et al. |
| 2005/0273626 A1 | 12/2005 | Pearson et al. |
| 2005/0288936 A1 | 12/2005 | Busayapongchai et al. |
| 2005/0289463 A1 | 12/2005 | Wu et al. |
| 2006/0009973 A1 | 1/2006 | Nguyen et al. |
| 2006/0018492 A1 | 1/2006 | Chiu et al. |
| 2006/0020890 A1 | 1/2006 | Kroll et al. |
| 2006/0061488 A1 | 3/2006 | Dunton |
| 2006/0095848 A1 | 5/2006 | Naik |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0143559 A1* | 6/2006 | Spielberg ................. G06F 3/165 715/201 |
| 2006/0194181 A1* | 8/2006 | Rosenberg ................ G09B 5/06 434/317 |
| 2006/0217967 A1 | 9/2006 | Goertzen et al. |
| 2006/0235700 A1 | 10/2006 | Wong et al. |
| 2006/0293886 A1 | 12/2006 | Odell et al. |
| 2007/0006098 A1 | 1/2007 | Krumm et al. |
| 2007/0027732 A1 | 2/2007 | Hudgens |
| 2007/0038436 A1 | 2/2007 | Cristo et al. |
| 2007/0041361 A1 | 2/2007 | Iso-Sipila |
| 2007/0050191 A1 | 3/2007 | Weider et al. |
| 2007/0055514 A1* | 3/2007 | Beattie et al. .................. 704/235 |
| 2007/0055525 A1 | 3/2007 | Kennewick et al. |
| 2007/0055529 A1 | 3/2007 | Kanevsky et al. |
| 2007/0058322 A1 | 3/2007 | Hug et al. |
| 2007/0088556 A1 | 4/2007 | Andrew |
| 2007/0094026 A1 | 4/2007 | Ativanichayaphong et al. |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0118378 A1 | 5/2007 | Skuratovsky |
| 2007/0135949 A1 | 6/2007 | Snover et al. |
| 2007/0156627 A1 | 7/2007 | D'Alicandro |
| 2007/0174188 A1 | 7/2007 | Fish |
| 2007/0185754 A1 | 8/2007 | Schmidt |
| 2007/0185917 A1 | 8/2007 | Prahlad et al. |
| 2007/0198269 A1 | 8/2007 | Braho et al. |
| 2007/0203955 A1 | 8/2007 | Pomerantz |
| 2007/0208569 A1 | 9/2007 | Subramanian et al. |
| 2007/0211071 A1 | 9/2007 | Slotznick et al. |
| 2007/0225980 A1 | 9/2007 | Sumita |
| 2007/0271104 A1 | 11/2007 | McKay |
| 2007/0276651 A1 | 11/2007 | Bliss et al. |
| 2007/0276714 A1 | 11/2007 | Beringer |
| 2007/0282595 A1 | 12/2007 | Tunning et al. |
| 2008/0012950 A1 | 1/2008 | Lee et al. |
| 2008/0015864 A1 | 1/2008 | Ross et al. |
| 2008/0021708 A1 | 1/2008 | Bennett et al. |
| 2008/0027726 A1* | 1/2008 | Hansen .................. G10L 13/00 704/260 |
| 2008/0034032 A1 | 2/2008 | Healey et al. |
| 2008/0052063 A1 | 2/2008 | Bennett et al. |
| 2008/0056579 A1 | 3/2008 | Guha |
| 2008/0077384 A1 | 3/2008 | Agapi et al. |
| 2008/0079566 A1 | 4/2008 | Singh et al. |
| 2008/0082332 A1 | 4/2008 | Mallett et al. |
| 2008/0082338 A1 | 4/2008 | O'Neil et al. |
| 2008/0082651 A1 | 4/2008 | Singh et al. |
| 2008/0120112 A1 | 5/2008 | Jordan et al. |
| 2008/0120342 A1* | 5/2008 | Reed et al. ................. 707/104.1 |
| 2008/0126100 A1 | 5/2008 | Grost et al. |
| 2008/0129520 A1 | 6/2008 | Lee |
| 2008/0131006 A1 | 6/2008 | Oliver |
| 2008/0140413 A1* | 6/2008 | Millman et al. ............. 704/270 |
| 2008/0140416 A1 | 6/2008 | Shostak |
| 2008/0140652 A1* | 6/2008 | Millman et al. .................. 707/6 |
| 2008/0140657 A1 | 6/2008 | Azvine et al. |
| 2008/0189114 A1 | 8/2008 | Fail et al. |
| 2008/0221903 A1 | 9/2008 | Kanevsky et al. |
| 2008/0228463 A1 | 9/2008 | Mori et al. |
| 2008/0228490 A1* | 9/2008 | Fischer et al. ............. 704/270.1 |
| 2008/0228496 A1 | 9/2008 | Yu et al. |
| 2008/0240569 A1 | 10/2008 | Tonouchi |
| 2008/0247519 A1 | 10/2008 | Abella et al. |
| 2008/0249770 A1 | 10/2008 | Kim et al. |
| 2008/0255837 A1 | 10/2008 | Kahn et al. |
| 2008/0256613 A1 | 10/2008 | Grover |
| 2008/0270118 A1 | 10/2008 | Kuo et al. |

(56) References Cited

U.S. PATENT DOCUMENTS

| | | |
|---|---|---|
| 2008/0281510 A1 | 11/2008 | Shahine |
| 2008/0300878 A1 | 12/2008 | Bennett |
| 2008/0313335 A1 | 12/2008 | Jung et al. |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0011709 A1 | 1/2009 | Akasaka et al. |
| 2009/0018835 A1 | 1/2009 | Cooper et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0070097 A1 | 3/2009 | Wu et al. |
| 2009/0076792 A1 | 3/2009 | Lawson-Tancred |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112572 A1* | 4/2009 | Thorn ............................... 704/3 |
| 2009/0112677 A1 | 4/2009 | Rhett |
| 2009/0123071 A1 | 5/2009 | Iwasaki |
| 2009/0125477 A1 | 5/2009 | Lu et al. |
| 2009/0150156 A1 | 6/2009 | Kennewick et al. |
| 2009/0157401 A1 | 6/2009 | Bennett |
| 2009/0164441 A1 | 6/2009 | Cheyer |
| 2009/0171664 A1 | 7/2009 | Kennewick et al. |
| 2009/0187577 A1 | 7/2009 | Reznik et al. |
| 2009/0191895 A1 | 7/2009 | Singh et al. |
| 2009/0204409 A1 | 8/2009 | Mozer et al. |
| 2009/0222488 A1 | 9/2009 | Boerries et al. |
| 2009/0228126 A1 | 9/2009 | Spielberg et al. |
| 2009/0239552 A1 | 9/2009 | Churchill et al. |
| 2009/0271109 A1 | 10/2009 | Lee et al. |
| 2009/0271175 A1 | 10/2009 | Bodin et al. |
| 2009/0271178 A1 | 10/2009 | Bodin et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0036660 A1 | 2/2010 | Bennett |
| 2010/0042400 A1 | 2/2010 | Block et al. |
| 2010/0049514 A1 | 2/2010 | Kennewick et al. |
| 2010/0057457 A1 | 3/2010 | Ogata et al. |
| 2010/0070899 A1 | 3/2010 | Hunt et al. |
| 2010/0081456 A1 | 4/2010 | Singh et al. |
| 2010/0088020 A1 | 4/2010 | Sano et al. |
| 2010/0088100 A1 | 4/2010 | Lindahl |
| 2010/0131273 A1 | 5/2010 | Aley-Raz et al. |
| 2010/0138215 A1 | 6/2010 | Williams |
| 2010/0138416 A1 | 6/2010 | Bellotti |
| 2010/0145700 A1 | 6/2010 | Kennewick et al. |
| 2010/0146442 A1 | 6/2010 | Nagasaka et al. |
| 2010/0161554 A1 | 6/2010 | Datuashvili et al. |
| 2010/0204986 A1 | 8/2010 | Kennewick et al. |
| 2010/0217604 A1 | 8/2010 | Baldwin et al. |
| 2010/0225809 A1* | 9/2010 | Connors ............ G06F 15/0283 348/500 |
| 2010/0228540 A1 | 9/2010 | Bennett |
| 2010/0231474 A1* | 9/2010 | Yamagajo et al. ............ 343/767 |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0286985 A1 | 11/2010 | Kennewick et al. |
| 2010/0299133 A1 | 11/2010 | Kopparapu et al. |
| 2010/0299142 A1 | 11/2010 | Freeman et al. |
| 2010/0312547 A1 | 12/2010 | van Os et al. |
| 2010/0318576 A1 | 12/2010 | Kim |
| 2010/0324709 A1* | 12/2010 | Starmen ............... G06F 17/241 700/94 |
| 2010/0324895 A1 | 12/2010 | Kurzweil et al. |
| 2010/0324905 A1 | 12/2010 | Kurzweil et al. |
| 2010/0332235 A1 | 12/2010 | David |
| 2010/0332280 A1 | 12/2010 | Bradley et al. |
| 2010/0332348 A1 | 12/2010 | Cao |
| 2011/0047072 A1 | 2/2011 | Ciurea |
| 2011/0054901 A1* | 3/2011 | Qin et al. ....................... 704/254 |
| 2011/0060807 A1 | 3/2011 | Martin et al. |
| 2011/0076994 A1 | 3/2011 | Kim et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0153330 A1 | 6/2011 | Yazdani et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0184730 A1 | 7/2011 | LeBeau et al. |
| 2011/0218855 A1 | 9/2011 | Cao et al. |
| 2011/0224972 A1 | 9/2011 | Millett et al. |
| 2011/0231182 A1 | 9/2011 | Weider et al. |
| 2011/0231184 A1* | 9/2011 | Kerr ................ H04M 1/72522 704/201 |
| 2011/0231188 A1 | 9/2011 | Kennewick et al. |
| 2011/0231474 A1* | 9/2011 | Locker et al. ................ 709/203 |
| 2011/0260861 A1 | 10/2011 | Singh et al. |
| 2011/0264643 A1 | 10/2011 | Cao |
| 2011/0279368 A1 | 11/2011 | Klein et al. |
| 2011/0288861 A1* | 11/2011 | Kurzweil et al. ............ 704/235 |
| 2011/0298585 A1 | 12/2011 | Barry |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | LeBeau et al. |
| 2012/0035932 A1 | 2/2012 | Jitkoff et al. |
| 2012/0042343 A1 | 2/2012 | Laligand et al. |
| 2012/0066581 A1* | 3/2012 | Spalink ............ G06F 17/30716 715/232 |
| 2012/0084086 A1 | 4/2012 | Gilbert et al. |
| 2012/0084634 A1* | 4/2012 | Wong ................... G06F 17/241 715/233 |
| 2012/0137367 A1 | 5/2012 | Dupont et al. |
| 2012/0149394 A1 | 6/2012 | Singh et al. |
| 2012/0173464 A1 | 7/2012 | Tur et al. |
| 2012/0197998 A1* | 8/2012 | Kessel et al. ................ 709/205 |
| 2012/0214517 A1 | 8/2012 | Singh et al. |
| 2012/0245719 A1* | 9/2012 | Story et al. ..................... 700/94 |
| 2012/0265528 A1 | 10/2012 | Gruber et al. |
| 2012/0271635 A1 | 10/2012 | Ljolje |
| 2012/0271676 A1 | 10/2012 | Aravamudan et al. |
| 2012/0310642 A1 | 12/2012 | Cao et al. |
| 2012/0310649 A1 | 12/2012 | Cannistraro et al. |
| 2012/0311583 A1 | 12/2012 | Gruber et al. |
| 2012/0330661 A1 | 12/2012 | Lindahl |
| 2013/0006638 A1 | 1/2013 | Lindahl |
| 2013/0110518 A1 | 5/2013 | Gruber et al. |

(56) References Cited

U.S. PATENT DOCUMENTS

| | | |
|---|---|---|
| 2013/0110520 A1 | 5/2013 | Cheyer et al. |
| 2013/0325443 A1 | 12/2013 | Begeja et al. |

FOREIGN PATENT DOCUMENTS

| | | |
|---|---|---|
| DE | 198 41 541 B4 | 12/2007 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0559349 B1 | 9/1993 |
| EP | 0570660 A1 | 11/1993 |
| EP | 0863453 A1 | 9/1998 |
| EP | 1229496 A2 | 8/2002 |
| EP | 1245023 A1 | 10/2002 |
| EP | 2 109 295 A1 | 10/2009 |
| GB | 2293667 A | 4/1996 |
| JP | 06 019965 | 1/1994 |
| JP | 7-199379 A | 8/1995 |
| JP | 2000-207167 A | 7/2000 |
| JP | 2001 125896 | 5/2001 |
| JP | 2002 024212 | 1/2002 |
| JP | 2002-169588 A | 6/2002 |
| JP | 2002-344880 A | 11/2002 |
| JP | 2003 517158 A | 5/2003 |
| JP | 2004-152063 A | 5/2004 |
| JP | 2005-070645 A | 3/2005 |
| JP | 2005-189454 A | 7/2005 |
| JP | 2006-023860 A | 1/2006 |
| JP | 2007-206317 A | 8/2007 |
| JP | 2009 036999 | 2/2009 |
| JP | 2013-511214 A | 3/2013 |
| KR | 10-2007-0057496 | 6/2007 |
| KR | 10-0776800 B1 | 11/2007 |
| KR | 10-2008-001227 | 2/2008 |
| KR | 10-0810500 B1 | 3/2008 |
| KR | 10 2008 109322 A | 12/2008 |
| KR | 10 2009 086805 A | 8/2009 |
| KR | 10-0920267 B1 | 10/2009 |
| KR | 10-2010-0032792 | 4/2010 |
| KR | 10-2010-0119519 A | 11/2010 |
| KR | 10 2011 0113414 A | 10/2011 |
| WO | WO 95/02221 | 1/1995 |
| WO | WO 97/26612 | 7/1997 |
| WO | WO 98/41956 | 9/1998 |
| WO | WO 99/01834 | 1/1999 |
| WO | WO 99/08238 | 2/1999 |
| WO | WO 99/56227 | 11/1999 |
| WO | WO 2000/60435 | 10/2000 |
| WO | WO 2000/60435 A3 | 10/2000 |
| WO | WO 02/073603 A1 | 9/2002 |
| WO | WO 2006/129967 A1 | 12/2006 |
| WO | WO 2008/085742 A2 | 7/2008 |
| WO | WO 2008/109835 A2 | 9/2008 |
| WO | 2010/075623 A1 | 7/2010 |
| WO | 2011/060106 A1 | 5/2011 |
| WO | WO 2011/088053 A2 | 7/2011 |

OTHER PUBLICATIONS

Acero, A., et al., "Robust Speech Recognition by Normalization of the Acoustic Space," International Conference on Acoustics, Speech, and Signal Processing, 1991, 4 pages.

Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.

Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.

Anastasakos, A., et al., "Duration Modeling in Large Vocabulary Speech Recognition," International Conference on Acoustics, Speech, and Signal Processing (ICASSP'95), May 9-12, 1995, 4 pages.

Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.

Ansari, R., et al., "Pitch Modification of Speech using a Low-Sensitivity Inverse Filter Approach," IEEE Signal Processing Letters, vol. 5, No. 3, Mar. 1998, 3 pages.

Anthony, N. J., et al., "Supervised Adaption for Signature Verification System," Jun. 1, 1978, IBM Technical Disclosure, 3 pages.

Apple Computer, "Guide Maker User's Guide," © Apple Computer, Inc., Apr. 27, 1994, 8 pages.

Apple Computer, "Introduction to Apple Guide," © Apple Computer, Inc., Apr. 28, 1994, 20 pages.

Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.

Atal, B. S., "Efficient Coding of LPC Parameters by Temporal Decomposition," IEEE International Conference on Acoustics, Speech, and Signal Processing (ICASSP'83), Apr. 1983, 4 pages.

Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.

Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.

Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.

Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.

Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.

Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.

Banbrook, M., "Nonlinear Analysis of Speech from a Synthesis Perspective," A thesis submitted for the degree of Doctor of Philosophy, The University of Edinburgh, Oct. 15, 1996, 35 pages.

Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.

Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris—France, Jul. 1993, 11 pages.

Bellegarda, J. R., "A Latent Semantic Analysis Framework for Large-Span Language Modeling," 5th European Conference on Speech, Communication and Technology, (EUROSPEECH'97), Sep. 22-25, 1997, 4 pages.

Bellegarda, J. R., "A Multispan Language Modeling Framework for Large Vocabulary Speech Recognition," IEEE Transactions on Speech and Audio Processing, vol. 6, No. 5, Sep. 1998, 12 pages.

(56) References Cited

OTHER PUBLICATIONS

Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.
Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges,15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages.
Hermansky, H., "Perceptual Linear Predictive (PLP) Analysis of Speech," Journal of the Acoustical Society of America, vol. 87, No. 4, Apr. 1990, 15 pages.
Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dspguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.

(56) References Cited

OTHER PUBLICATIONS

Kitano, H., "PhiDM-Dialog, An Experimental Speech-to-Speech Dialog Translation System," Jun. 1991 Computer, vol. 24, No. 6, 13 pages.

Klabbers, E., et al., "Reducing Audible Spectral Discontinuities," IEEE Transactions on Speech and Audio Processing, vol. 9, No. 1, Jan. 2001, 13 pages.

Klatt, D. H., "Linguistic Uses of Segmental Duration in English: Acoustic and Perpetual Evidence," Journal of the Acoustical Society of America, vol. 59, No. 5, May 1976, 16 pages.

Kominek, J., et al., "Impact of Durational Outlier Removal from Unit Selection Catalogs," 5th ISCA Speech Synthesis Workshop, Jun. 14-16, 2004, 6 pages.

Kubala, F., et al., "Speaker Adaptation from a Speaker-Independent Training Corpus," International Conference on Acoustics, Speech, and Signal Processing (ICASSP'90), Apr. 3-6, 1990, 4 pages.

Kubala, F., et al., "The Hub and Spoke Paradigm for CSR Evaluation," Proceedings of the Spoken Language Technology Workshop, Mar. 6-8, 1994, 9 pages.

Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.

Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

Lee, L, et al., "Golden Mandarin(II)-An Improved Single-Chip Real-Time Mandarin Dictation Machine for Chinese Language with Very Large Vocabulary," 0-7803-0946-4/93 © 1993 1EEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-HARPY Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration—Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

(56) References Cited

OTHER PUBLICATIONS

Scagliola, C., "Language Models and Search Algorithms for Real-Time Speech Recognition," International Journal of Man-Machine Studies, vol. 22, No. 5, 1985, 25 pages.

Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.

Sheth B., et al., "Evolving Agents for Personalized Information Filtering," In Proceedings of the.Ninth Conference on Artificial Intelligence for Applications, Mar. 1-5, 1993, 9 pages.

Shikano, K., et al., "Speaker Adaptation Through Vector Quantization," IEEE International Conference on Acoustics, Speech, and Signal Processing (ICASSP'86), vol. 11, Apr. 1986, 4 pages.

Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.

Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.

Tenenbaum, A.M., et al., "Data Structure Using Pascal," 1981 Prentice-Hall, Inc., 34 pages.

Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.

Udell, J., "Computer Telephony," Byte, vol. 19, No. 7, Jul. 1, 1994, 9 pages.

Van Santen, J. P. H., "Contextual Effects on Vowel Duration," Journal Speech Communication, vol. 11, No. 6, Dec. 1992, 34 pages.

Vepa, J., et al., "New Objective Distance Measures for Spectral Discontinuities in Concatenative Speech Synthesis," In Proceedings of the IEEE 2002 Workshop on Speech Synthesis, 4 pages.

Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.

Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.

Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.

Wikipedia, "Mel Scale," Wikipedia, the free encyclopedia, http://en.wikipedia.org/wiki/Mel_scale, 2 pages.

Wikipedia, "Minimum Phase," Wikipedia, the free encyclopedia, http://en.wikipedia.org/wiki/Minimum_phase, 8 pages.

Wolff, M., "Poststructuralism and the ARTFUL Database: Some Theoretical Considerations," Information Technology and Libraries, vol. 13, No. 1, Mar. 1994, 10 pages.

Wu, M., "Digital Speech Processing and Coding," ENEE408G Capstone-Multimedia Signal Processing, Spring 2003, Lecture—2 course presentation, University of Maryland, College Park, 8 pages.

Wu, M., "Speech Recognition, Synthesis, and H.C.I.," ENEE408G Capstone-Multimedia Signal Processing, Spring 2003, Lecture—3 course presentation, University of Maryland, College Park, 11 pages.

Wyle, M. F., "A Wide Area Network Information Filter," In Proceedings of First International Conference on Artificial Intelligence on Wall Street, Oct. 9-11, 1991, 6 pages.

Yankelovich, N., et al., "Intermedia: The Concept and the Construction of a Seamless Information Environment," Computer Magazine, Jan. 1988, © 1988 IEEE, 16 pages.

Yoon, K., et al., "Letter-to-Sound Rules for Korean," Department of Linguistics, The Ohio State University, 2002, 4 pages.

Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.

Zovato, E., et al., "Towards Emotional Speech Synthesis: A Rule Based Approach," 2 pages.

International Search Report dated Nov. 9, 1994, received in International Application No. PCT/US1993/12666, which corresponds to U.S. Appl. No. 07/999,302, 8 pages (Robert Don Strong).

International Preliminary Examination Report dated Mar. 1, 1995, received in International Application No. PCT/US1993/12666, which corresponds to U.S. Appl. No. 07/999,302, 5 pages (Robert Don Strong).

International Preliminary Examination Report dated Apr. 10, 1995, received in International Application No. PCT/US1993/12637, which corresponds to U.S. Appl. No. 07/999,354, 7 pages (Alejandro Acero).

International Search Report dated Feb. 8, 1995, received in International Application No. PCT/US1994/11011, which corresponds to U.S. Appl. No. 08/129,679, 7 pages (Yen-Lu Chow).

International Preliminary Examination Report dated Feb. 28, 1996, received in International Application No. PCT/US1994/11011, which corresponds to U.S. Appl. No. 08/129,679, 4 pages (Yen-Lu Chow).

Written Opinion dated Aug. 21, 1995, received in International Application No. PCT/US1994/11011, which corresponds to U.S. Appl. No. 08/129,679, 4 pages (Yen-Lu Chow).

International Search Report dated Nov. 8, 1995, received in International Application No. PCT/US1995/08369, which corresponds to U.S. Appl. No. 08/271,639, 6 pages. (Peter V. De Souza).

International Preliminary Examination Report dated Oct. 9, 1996, received in International Application No. PCT/US1995/08369, which corresponds to U.S. Appl. No. 08/271,639, 4 pages (Peter V. De Souza).

Office Action dated Jun. 24, 2013, received in U.S. Appl. No. 13/267,738, 41 pages (Cao).

Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.

Alfred App, 2011, http://www.alfredapp.com/, 5 pages.

Ambite, JL., et al., "Design and Implementation of the CALO Query Manager," Copyright © 2006, American Association for Artificial Intelligence, (www.aaai.org), 8 pages.

Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://wvvw.isi.edu/people/ambite/publications/integration_heterogeneous_knowledge_sources_calo_query_manager, 18 pages.

Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/surnmary?doi=10.1.1.10.6538, 5 pages.

Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.

Bussler, C., et al., "Web Service Execution Environment (WSMX)," Jun. 3, 2005, W3C Member Submission, http://www.w3.org/Submission/WSMX, 29 pages.

Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.

Chen, Y., "Multimedia Siri Finds and Plays Whatever You Ask for," Feb. 9, 2012, http://www.psfk.com/2012/02/multimedia-siri.html, 9 pages.

Cheyer, A., "About Adam Cheyer," Sep. 17, 2012, http://www.adam.cheyer.com/about.html, 2 pages.

Cheyer, A., "A Perspective on AI & Agent Technologies for SCM," VerticalNet, 2001 presentation, 22 pages.

(56) References Cited

OTHER PUBLICATIONS

Cheyer, A. et al., "Spoken Language and Multimodal Applications for Electronic Realties," © Springer-Verlag London Ltd, Virtual Reality 1999, 3:1-15, 15 pages.

Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.

Domingue, J., et al., "Web Service Modeling Ontology (WSMO)—An Ontology for Semantic Web Services," Jun. 9-10, 2005, position paper at the W3C Workshop on Frameworks for Semantics in Web Services, Innsbruck, Austria, 6 pages.

Elio, R. et al., "On Abstract Task Models and Conversation Policies," http://webdocs.cs.ualberta.ca/~ree/publications/papers2/ATS.AA99.pdf, May 1999, 10 pages.

Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.

Evi, "Meet Evi: the one mobile app that provides solutions for your everyday problems," Feb. 8, 2012, http://www.evi.com/, 3 pages.

Feigenbaum, E., et al., "Computer-assisted Semantic Annotation of Scientific Life Works," 2007, http://tomgruber.org/writing/stanford-cs300.pdf, 22 pages.

Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.

Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.

Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.

Glass, A., "Explaining Preference Learning," 2006, http://cs229.stanford.edu/proj2006/Glass-ExplainingPreferenceLearning.pdf, 5 pages.

Glass, J., et al., "Multilingual Spoken-Language Understanding in the MIT Voyager System," Aug. 1995, http://groups.csail.mit.edu/sls/publications/1995/speechcomm95-voyager.pdf, 29 pages.

Goddeau, D., et al., "A Form-Based Dialogue Manager for Spoken Language Applications," Oct. 1996, http://phasedance.com/pdf/icslp96.pdf, 4 pages.

Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.

Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.

Gruber, T. R., "A Translation Approach to Portable Ontology Specifications," Knowledge Systems Laboratory, Stanford University, Sep. 1992, Technical Report KSL 92-71, Revised Apr. 1993, 27 pages.

Gruber, T. R., "Automated Knowledge Acquisition for Strategic Knowledge," Knowledge Systems Laboratory, Machine Learning, 4, 293-336 (1989), 44 pages.

Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.

Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem.2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of the Next Twenty Years series, vol. 1, Issue 6, Aug. 2001, http://www.tnty.com/newsletter/futures/archive/v01-05business.html, 5 pages.

Gruber, T. R., et al.,"NIKE: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," Iin International Journal Human-

(56) References Cited

OTHER PUBLICATIONS

Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.
Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.
Guzzoni, D., et al., "Active, A Tool for Building Intelligent User Interfaces," ASC 2007, Palma de Mallorca, http://lsro.epfl.ch/page-34241.html, 6 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Guzzoni, D., et al., "Modeling Human-Agent Interaction with Active Ontoiogies," 2007, AAAI Spring Symposium, Interaction Challenges for Intelligent Assistants, Stanford University, Palo Alto, California, 8 pages.
Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.
Intraspect Software, "The Intraspect Knowledge Management Solution: Technical Overview," http://tomgruber.org/writing/intraspect-whitepaper-1998.pdf, 18 pages.
Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.
Karp, P. D., "A Generic Knowledge-Base Access Protocol," May 12, 1994, http://lecture.cs.buu.ac.th/~f50353/Document/gfp.pdf, 66 pages.
Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.
Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.
Lieberman, H., et al., "Out of context: Computer systems that adapt to, and learn from, context," 2000, IBM Systems Journal, vol. 39, Nos. 3/4, 2000, 16 pages.
Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.
McGuire, J., et al., "SHADE: Technology for Knowledge-Based Collaborative Engineering," 1993, Journal of Concurrent Engineering: Applications and Research (CERA), 18 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.
Mitra, P., et al., "A Graph-Oriented Model for Articulation of Ontology Interdependencies," 2000, http://ilpubs.stanford.edu:8090/442/1/2000-20.pdf, 15 pages.
Moran, D. B., et al., "Multimodal User Interfaces in the Open Agent Architecture," Proc. of the 1997 International Conference on Intelligent User Interfaces (IUI97), 8 pages.
Mozer, M., "An Intelligent Environment Must be Adaptive," Mar./Apr. 1999, IEEE Intelligent Systems, 3 pages.
Mühlhäuser, M., "Context Aware Voice User Interfaces for Workflow Support," Darmstadt 2007, http://tuprints.ulb.tu-darmstadt.de/876/1/PhD.pdf, 254 pages.
Naone, E., "TR10: Intelligent Software Assistant," Mar.-Apr. 2009, Technology Review, http://www.technologyreview.com/printer_friendly_article.aspx?id=22117, 2 pages.
Neches, R., "Enabling Technology for Knowledge Sharing," Fall 1991, AI Magazine, pp. 37-56, (21 pages).
Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.
*Phoenix Solutions, Inc.* v. *West Interactive Corp.*, Document 40, Declaration of Christopher Schmandt Regarding the MIT Galaxy System dated Jul. 2, 2010, 162 pages.
Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, (http://tomgruber.org/writing/ks1-95-69.pdf, Sep. 1995.) CHI '96 Proceedings: Conference on Human Factors in Computing Systems, Apr. 13-18, 1996, Vancouver, BC, Canada, 14 pages.
Rivlin, Z., et al., "Maestro: Conductor of Multimedia Analysis Technologies," 1999 SRI International, Communications of the Association for Computing Machinery (CACM), 7 pages.
Roddy, D., et al., "Communication and Collaboration in a Landscape of B2B eMarketplaces," VerticalNet Solutions, white paper, Jun. 15, 2000, 23 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16 . . . rep . . . , 4 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http:// www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakTolt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Vlingo, "Vlingo Launches Voice Enablement Application on Apple App Store," Vlingo press release dated Dec. 3, 2008, 2 pages.
YouTube, "Knowledge Navigator," 5:34 minute video uploaded to YouTube by Knownav on Apr. 29, 2008, http://www.youtube.com/watch?v=QRH8eimU_20, 1 page.
YouTube,"Send Text, Listen to and Send E-Mail 'By Voice' www.voiceassist.com," 2:11 minute video uploaded to YouTube by VoiceAssist on Jul 30, 2009, http://www.youtube.com/watch?v=0tEU61nHHA4, 1 page.
YouTube,"Text'nDrive App Demo—Listen and Reply to your Messages by Voice while Driving!," 1:57 minute video uploaded to YouTube by TextnDrive on Apr 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.conn/watch?v=pJqpWgQS98w, 1 page.

(56) References Cited

OTHER PUBLICATIONS

Zue, V., "Conversational Interfaces: Advances and Challenges," Sep. 1997, http://www.cs.cmu.edu/~dod/papers/zue97.pdf, 10 pages.

Zue, V. W., "Toward Systems that Understand Spoken Language," Feb. 1994, ARPA Strategic Computing Institute, © 1994 IEEE, 9 pages.

International Search Report and Written Opinion dated Nov. 29, 2011, received in International Application No. PCT/US2011/ 20861, which corresponds to U.S. Appl. No. 12/987,982, 15 pages (Thomas Robert Gruber).

Agnäs, MS., et al., "Spoken Language Translator: First-Year Report," Jan. 1994, SICS (ISSN 0283-3638), SRI and Telia Research AB, 161 pages.

Allen, J., "Natural Language Understanding," 2nd Edition, Copyright © 1995 by the Benjamin/Cummings Publishing Company, Inc., 671 pages.

Alshawi, H., et al., "CLARE: A Contextual Reasoning and Cooperative Response Framework for the Core Language Engine," Dec. 1992, SRI International, Cambridge Computer Science Research Centre, Cambridge, 273 pages.

Alshawi, H., et al., "Declarative Derivation of Database Queries from Meaning Representations," Oct. 1991, Proceedings of the BANKAI Workshop on Intelligent Information Access, 12 pages.

Alshawi H., et al., "Logical Forms in the Core Language Engine," 1989, Proceedings of the 27th Annual Meeting of the Association for Computational Linguistics, 8 pages.

Alshawi, H., et al., "Overview of the Core Language Engine," Sep. 1988, Proceedings of Future Generation Computing Systems, Tokyo, 13 pages.

Alshawi, H., "Translation and Monotonic Interpretation/ Generation," Jul. 1992, SRI International, Cambridge Computer Science Research Centre, Cambridge, 18 pages, http://www.cam.sri.com/tr/crc024/paper.ps.Z_1992.

Appelt, D., et al., "Fastus: A Finite-state Processor for Information Extraction from Real-world Text," 1993, Proceedings of IJCAI, 8 pages.

Appelt, D., et al., "SRI: Description of the JV-FASTUS System Used for MUC-5," 1993, SRI International, Artificial Intelligence Center, 19 pages.

Appelt, D., et al., SRI International Fastus System MUC-6 Test Results and Analysis, 1995, SRI International, Menlo Park, California, 12 pages.

Archbold, A., et al., "A Team User's Guide," Dec. 21, 1981, SRI International, 70 pages.

Bear, J., et al., "A System for Labeling Self-Repairs in Speech," Feb. 22, 1993, SRI International, 9 pages.

Bear, J., et al., "Detection and Correction of Repairs in Human-Computer Dialog," May 5, 1992, SRI International, 11 pages.

Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.

Bear, J., et al., "Using Information Extraction to Improve Document Retrieval," 1998, SRI International, Menlo Park, California, 11 pages.

Berry, P., et al., "Task Management under Change and Uncertainty Constraint Solving Experience with the CALO Project," 2005, Proceedings of CP'05 Workshop on Constraint Solving under Change, 5 pages.

Bobrow, R. et al., "Knowledge Representation for Syntactic/ Semantic Processing," From: AAA-80 Proceedings. Copyright © 1980, AAAI, 8 pages.

Bouchou, B., et al., "Using Transducers in Natural Language Database Query," Jun. 17-19, 1999, Proceedings of 4th International Conference on Applications of Natural Language to Information Systems, Austria, 17 pages.

Bratt, H., et al., "The SRI Telephone-based ATIS System," 1995, Proceedings of ARPA Workshop on Spoken Language Technology, 3 pages.

Bulyko, I. et al., "Error-Correction Detection and Response Generation in a Spoken Dialogue System," © 2004 Elsevier B.V., specom.2004.09.009, 18 pages.

Burke, R., et al., "Question Answering from Frequently Asked Question Files," 1997, AI Magazine, vol. 18, No. 2, 10 pages.

Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.

Carter, D., "Lexical Acquisition in the Core Language Engine," 1989, Proceedings of the Fourth Conference of the European Chapter of the Association for Computational Linguistics, 8 pages.

Carter, D., et al., "The Speech-Language Interface in the Spoken Language Translator," Nov. 23, 1994, SRI International, 9 pages.

Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.

Cheyer, A., et al., "Multimodal Maps: An Agent-based Approach," International Conference on Cooperative Multimodal Communication, 1995, 15 pages.

Cheyer, A., et al., "The Open Agent Architecture," Autonomous Agents and Multi-Agent systems, vol. 4, Mar. 1, 2001, 6 pages.

Cheyer, A., et al., "The Open Agent Architecture: Building communities of distributed software agents" Feb. 21, 1998, Artificial Intelligence Center SRI International, Power Point presentation, downloaded from http://www.ai.sri.com/~oaa/, 25 pages.

Codd, E. F., "Databases: Improving Usability and Responsiveness— 'How About Recently'," Copyright © 1978, by Academic Press, Inc., 28 pages.

Cohen, P.R., et al., "An Open Agent Architecture," 1994, 8 pages. http://citeseerx.ist.psu.edu/viewdoc/summary?doi=10.1.1.30.480.

Coles, L. S., et al., "Chemistry Question-Answering," Jun. 1969, SRI International, 15 pages.

Coles, L. S., "Techniques for Information Retrieval Using an Inferential Question-Answering System with Natural-Language Input," Nov. 1972, SRI International, 198 Pages.

Coles, L. S., "The Application of Theorem Proving to Information Retrieval," Jan. 1971, SRI International, 21 pages.

Constantinides, P., et al., "A Schema Based Approach to Dialog Control," 1998, Proceedings of the International Conference on Spoken Language Processing, 4 pages.

Cox, R. V., et al., "Speech and Language Processing for Next-Millennium Communications Services," Proceedings of the IEEE, vol. 88, No. 8, Aug. 2000, 24 pages.

Craig, J., et al., "Deacon: Direct English Access and Control," Nov. 7-10, 1966 AFIPS Conference Proceedings, vol. 19, San Francisco, 18 pages.

Dar, S., et al., "DTL's DataSpot: Database Exploration Using Plain Language," 1998 Proceedings of the 24th VLDB Conference, New York, 5 pages.

Davis, Z., et al., "A Personal Handheld Multi-Modal Shopping Assistant," 2006 IEEE, 9 pages.

Decker, K., et al., "Designing Behaviors for Information Agents," The Robotics Institute, Carnegie-Mellon University, paper, Jul. 6, 1996, 15 pages.

Decker, K., et al., "Matchmaking and Brokering," The Robotics Institute, Carnegie-Mellon University, paper, May 16, 1996, 19 pages.

Dowding, J., et al., "Gemini: A Natural Language System for Spoken-Language Understanding," 1993, Proceedings of the Thirty-First Annual Meeting of the Association for Computational Linguistics, 8 pages.

Dowding, J., et al., "Interleaving Syntax and Semantics in an Efficient Bottom-Up Parser," 1994, Proceedings of the 32nd Annual Meeting of the Association for Computational Linguistics, 7 pages.

Epstein, M., et al., "Natural Language Access to a Melanoma Data Base," Sep. 1978, SRI International, 7 pages.

Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.

(56) References Cited

OTHER PUBLICATIONS

Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "TRIPS: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSs Access on the WWW: An Intelligent Agent Prototype," 1998 Proceedings of the Americas Conference on Information Systems—Association for Information Systems, 3 pages.
Grishman, R., "Computational Linguistics: An Introduction," © Cambridge University Press 1986, 172 pages.
Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "TEAM: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages. Best Copy Available.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of Eurospeech, 4 pages.
Issar, S., "Estimation of Language Models for New Spoken Language Applications," Oct. 3-6, 1996, Proceedings of 4th International Conference on Spoken language Processing, Philadelphia, 4 pages.
Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Kats, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "REXTOR: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Langly, P., et al.,"A Design for the Icarus Architechture," SIGART Bulletin, vol. 2, No. 4, 6 pages.
Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.

(56) References Cited

OTHER PUBLICATIONS

Martin, D., et al., "Development Tools for the Open Agent Architecture," Apr. 1996, Proceedings of the International Conference on the Practical Application of Intelligent Agents and Multi-Agent Technology, 17 pages.

Martin, D., et al., "Information Brokering in an Agent Architecture," Apr. 1997, Proceedings of the second International Conference on the Practical Application of Intelligent Agents and Multi-Agent Technology, 20 pages.

Martin, D., et al., "PAAM '98 Tutorial: Building and Using Practical Agent Applications," 1998, SRI International, 78 pages.

Martin, P., et al., "Transportability and Generality in a Natural-Language Interface System," Aug. 8-12, 1983, Proceedings of the Eight International Joint Conference on Artificial Intelligence, West Germany, 21 pages.

Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.

Michos, S.E., et al., "Towards an adaptive natural language interface to command languages," Natural Language Engineering 2 (3), © 1994 Cambridge University Press, 19 pages. Best Copy Available.

Milstead, J., et al., "Metadata: Cataloging by Any Other Name . . . " Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.

Modi, P. J., et al., "CMRadar: A Personal Assistant Agent for Calendar Management," © 2004, American Association for Artificial Intelligence, Intelligent Systems Demonstrations, 2 pages.

Moore, R., et al., "Combining Linguistic and Statistical Knowledge Sources in Natural-Language Processing for ATIS," 1995, SRI International, Artificial Intelligence Center, 4 pages.

Moore, R., "Handling Complex Queries in a Distributed Data Base," Oct. 8, 1979, SRI International, Artificial Intelligence Center, 38 pages.

Moore, R., "Practical Natural-Language Processing by Computer," Oct. 1981, SRI International, Artificial Intelligence Center, 34 pages.

Moore, R., et al., "SRI's Experience with the ATIS Evaluation," Jun. 24-27, 1990, Proceedings of a workshop held at Hidden Valley, Pennsylvania, 4 pages. Best Copy Available.

Moore, et al., "The Information Warefare Advisor: An Architecture for Interacting with Intelligent Agents Across the Web," Dec. 31, 1998 Proceedings of Americas Conference on Information Systems (AMCIS), 4 pages.

Moore, R., "The Role of Logic in Knowledge Representation and Commonsense Reasoning," Jun. 1982, SRI International, Artificial Intelligence Center, 19 pages.

Moore, R., "Using Natural-Language Knowledge Sources in Speech Recognition," Jan. 1999, SRI International, Artificial Intelligence Center, 24 pages.

Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.

Moran, D., "Quantifier Scoping in the SRI Core Language Engine," 1988, Proceedings of the 26th annual meeting on Association for Computational Linguistics, 8 pages.

Motro, A., "Flex: A Tolerant and Cooperative User Interface to Databases," IEEE Transactions on Knowledge and Data Engineering, vol. 2, No. 2, Jun. 1990, 16 pages.

Murveit, H., et al., "Speech Recognition in SRI's Resource Management and ATIS Systems," 1991, Proceedings of the workshop on Speech and Natural Language (HTL'91), 7 pages.

OAA, "The Open Agent Architecture 1.0 Distribution Source Code," Copyright 1999, SRI International, 2 pages.

Odubiyi, J., et al., "SAIRE—a scalable agent-based information retrieval engine," 1997 Proceedings of the First International Conference on Autonomous Agents, 12 pages.

Owei, V., et al., "Natural Language Query Filtration in the Conceptual Query Language," © 1997 IEEE, 11 pages.

Pannu, A., et al., "A Learning Personal Agent for Text Filtering and Notification," 1996, The Robotics Institute School of Computer Science, Carnegie-Mellon University, 12 pages.

Pereira, "Logic for Natural Language Analysis," Jan. 1983, SRI International, Artificial Intelligence Center, 194 pages.

Perrault, C.R., et al., "Natural-Language Interfaces," Aug. 22, 1986, SRI International, 48 pages.

Pulman, S.G., et al., "Clare: A Combined Language and Reasoning Engine," 1993, Proceedings of JFIT Conference, 8 pages. URL: http://www.cam.sri.com/tr/crc042/paper.ps.Z.

Ravishankar, "Efficient Algorithms for Speech Recognition," May 15, 1996, Doctoral Thesis submitted to School of Computer Science, Computer Science Division, Carnegie Mellon University, Pittsburg, 146 pages.

Rayner, M., et al., "Adapting the Core Language Engine to French and Spanish," May 10, 1996, Cornell University Library, 9 pages. http://arxiv.org/abs/cmp-Ig/9605015.

Rayner, M., "Abductive Equivalential Translation and its application to Natural Language Database Interfacing," Sep. 1993 Dissertation paper, SRI International, 163 pages.

Rayner, M., et al., "Deriving Database Queries from Logical Forms by Abductive Definition Expansion," 1992, Proceedings of the Third Conference on Applied Natural Language Processing, ANLC'92, 8 pages.

Rayner, M., "Linguistic Domain Theories: Natural-Language Database Interfacing from First Principles," 1993, SRI International, Cambridge, 11 pages.

Rayner, M., et al., "Spoken Language Translation With Mid-90's Technology: A Case Study," 1993, EUROSPEECH, ISCA, 4 pages. http://dblp.uni-trier.de/db/conf/interspeech/eurospeech1993.html#RaynerBCCDGKKLPPS93.

Rudnicky, A.I., et al., "Creating Natural Dialogs in the Carnegie Mellon Communicator System,", 1999,p. 1-5.

Russell, S., et al., "Artificial Intelligence, A Modern Approach," © 1995 Prentice Hall, Inc., 121 pages.

Sacerdoti, E., et al., "A Ladder User's Guide (Revised)," Mar. 1980, SRI International, Artificial Intelligence Center, 39 pages.

Sagalowicz, D., "A D-Ladder User's Guide," Sep. 1980, SRI International, 42 pages.

Sameshima, Y., et al., "Authorization with security attributes and privilege delegation Access control beyond the ACL," Computer Communications, vol. 20, 1997, 9 pages.

San-Segundo, R., et al., "Confidence Measures for Dialogue Management in the CU Communicator System," Jun. 5-9, 2000, Proceedings of Acoustics, Speech, and Signal Processing (ICASSP'00), 4 pages.

Sato, H., "A Data Model, Knowledge Base, and Natural Language Processing for Sharing a Large Statistical Database," 1989, Statistical and Scientific Database Management, Lecture Notes in Computer Science, vol. 339, 20 pages.

Schnelle, D., "Context Aware Voice User Interfaces for Workflow Support," Aug. 27, 2007, Dissertation paper, 254 pages.

Sharoff, S., et al., "Register-domain Separation as a Methodology for Development of Natural Language Interfaces to Databases," 1999, Proceedings of Human-Computer Interaction (INTERACT'99), 7 pages.

Shimazu, H., et al., "CAPIT: Natural Language Interface Design Tool with Keyword Analyzer and Case-Based Parser," NEC Research & Development, vol. 33, No. 4, Oct. 1992, 11 pages.

Shinkle, L., "Team User's Guide," Nov. 1984, SRI International, Artificial Intelligence Center, 78 pages.

Shklar, L., et al., "Info Harness: Use of Automatically Generated Metadata for Search and Retrieval of Heterogeneous Information," 1995 Proceedings of CAiSE'95, Finland, p. 1-14.

Singh, N., "Unifying Heterogeneous Information Models," 1998 Communications of the ACM, 13 pages.

(56) References Cited

OTHER PUBLICATIONS

SRI2009, "SRI Speech: Products: Software Development Kits: EduSpeak," 2009, 2 pages, available at http://web.archive.org/web/20090828084033/http://www.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.
Wahlster, W., et al., "Smartkom: multimodal communication with a life-like character," 2001 EUROSPEECH—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 Acm, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages. Best Copy Available.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, EUROSPEECH, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Japanese Office Action dated Jun. 18, 2013 for application No. 2012-126444, 7 pages.
Korean Notice of Allowance dated Sep. 16, 2013 for application No. 10-2012-60060, 7 pages.
International Preliminary Report on Patentability received for PCT Patent Application No. PCT/US2012/029810, dated Oct. 3, 2013, 9 pages.
"Interactive Voice", available online at <http://www.helloivee.com/company/> retrieved from internet on Feb. 10, 2014, 2 pages.
"Meet Ivee Your Wi-Fi Voice Activated Assistant", available online at <http://www.helloivee.com/> retrieved from internet on Feb. 10, 2014, 8 pages.
Apple Computer, "Knowledge Navigator", available online at <http://www.youtube.com/watch?v=QRH8eimU_20>, Uploaded on Apr. 29, 2008, 7 pages.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Bellegarda, Jerome R., "Latent Semantic Mapping", IEEE Signal Processing Magazine, Sep. 2005, pp. 70-80.
Cheyer et al., "Demonstration Video of Multimodal Maps Using an Agent Architecture", available online at <http://www.youtube.com/watch?v=x3TptMGT9EQ&feature=youtu.be>, published on 1996, 6 pages.
Cheyer et al., "Demonstration Video of Multimodal Maps Using an Open-Agent Architecture", available online at <http://www.youtube.com/watch?v=JUxaKnyZyM&feature=youtu.be>, published on 1996, 6 pages.
Cheyer, Adam, "Demonstration Video of Vanguard Mobile Portal", available online at <http://www.youtube.com/watch?v=ZTMsvg_0oLQ&feature=youtu.be>, published on 2004, 10 pages.
Kickstarter, "Ivee Sleek: Wi-Fi Voice-Activated Assistant", available online at <https://www.kickstartercom/discover/categories/hardware?ref=category> retrieved from internet on Feb. 10, 2014, 13 pages.
Anonymous, "Speaker Recognition", Wikipedia, The Free Enclyclopedia, Nov. 2, 2010, 3 pages.
International Search Report and Written Opinion received for PCT Patent Application No. PCT/US2012/029810, dated Aug. 17, 2012, 11 pages.
Extended European Search Report (inclusive of the Partial European Search Report and European Search Opinion) received for European Patent Application No. 12729332.2, dated Oct. 31, 2014, 6 pages.
International Preliminary Report on Patentability received for PCT Patent Application No. PCT/US2012/040801, dated Dec. 19, 2013, 16 pages.
International Search Report and Written Opinion received for PCT Patent Application No. PCT/US2012/040801, dated Oct. 22, 2012, 20 pages.
Amano Junko, "A User-Friendly Authoring System for Digital Talking Books", IEICE Technical Report, The Institute of Electronics, Information and Communication Engineers, vol. 103, No. 418, Nov. 6, 2003, pp. 33-40.
Amano et al., "A User-friendly Multimedia Book Authoring System", The Institute of Electronics, Information and Communication Engineers Technical Report, vol. 103, No. 416, Nov. 2003, pp. 33-40.

* cited by examiner

SWITCHING BETWEEN TEXT DATA AND AUDIO DATA BASED ON A MAPPING

CROSS-REFERENCE TO RELATED APPLICATIONS

The present application claims priority to U.S. Provisional Patent Application No. 61/493,372, entitled "Automatically Creating A Mapping Between Text Data And Audio Data And Switching Between Text Data And Audio Data Based On A Mapping," filed on Jun. 3, 2011, invented by Alan C. Cannistraro, et al., the entire disclosure of which is incorporated by reference for all purposes as if fully set forth herein.

The present application claims priority to U.S. Provisional Patent Application No. 61/494,375, entitled "Automatically Creating A Mapping Between Text Data And Audio Data And Switching Between Text Data And Audio Data Based On A Mapping," filed on Jun. 7, 2011, invented by Alan C. Cannistraro, et al., the entire disclosure of which is incorporated by reference for all purposes as if fully set forth herein.

The present application is related to U.S. patent application Ser. No. 13/267,738 entitled "Automatically Creating A Mapping Between Text Data And Audio Data," filed on Oct. 6, 2011, the entire disclosure of which is incorporated by reference for all purposes as if fully set forth herein.

FIELD OF THE INVENTION

The present invention relates to automatically creating a mapping between text data and audio data by analyzing the audio data to detect words reflected therein and compare those words to words in the document.

BACKGROUND

With the cost of handheld electronic devices decreasing and large demand for digital content, creative works that have once been published on printed media are increasingly becoming available as digital media. For example, digital books (also known as "e-books") are increasingly popular, along with specialized handheld electronic devices known as e-book readers (or "e-readers"). Also, other handheld devices, such as tablet computers and smart phones, although not designed solely as e-readers, have the capability to be operated as e-readers.

A common standard by which e-books are formatted is the EPUB standard (short for "electronic publication"), which is a free and open e-book standard by the International Digital Publishing Forum (IDPF). An EPUB file uses XHTML 1.1 (or DTBook) to construct the content of a book. Styling and layout are performed using a subset of CSS, referred to as OPS Style Sheets.

For some written works, especially those that become popular, an audio version of the written work is created. For example, a recording of a famous individual (or one with a pleasant voice) reading a written work is created and made available for purchase, whether online or in a brick and mortar store.

It is not uncommon for consumers to purchase both an e-book and an audio version (or "audio book") of the e-book. In some cases, a user reads the entirety of an e-book and then desires to listen to the audio book. In other cases, a user transitions between reading and listening to the book, based on the user's circumstances. For example, while engaging in sports or driving during a commute, the user will tend to listen to the audio version of the book. On the other hand, when lounging in a sofa-chair prior to bed, the user will tend to read the e-book version of the book. Unfortunately, such transitions can be painful, since the user must remember where she stopped in the e-book and manually locate where to begin in the audio book, or visa-versa. Even if the user remembers clearly what was happening in the book where the user left off, such transitions can still be painful because knowing what is happening does not necessarily make it easy to find the portion of an eBook or audio book that corresponds to those happenings. Thus, switching between an e-book and an audio book may be extremely time-consuming.

The specification "EPUB Media Overlays 3.0" defines a usage of SMIL (Synchronized Multimedia Integration Language), the Package Document, the EPUB Style Sheet, and the EPUB Content Document for representation of synchronized text and audio publications. A pre-recorded narration of a publication can be represented as a series of audio clips, each corresponding to part of the text. Each single audio clip, in the series of audio clips that make up a pre-recorded narration, typically represents a single phrase or paragraph, but infers no order relative to the other clips or to the text of a document. Media Overlays solve this problem of synchronization by tying the structured audio narration to its corresponding text in the EPUB Content Document using SMIL markup. Media Overlays are a simplified subset of SMIL 3.0 that allow the playback sequence of these clips to be defined.

Unfortunately, creating Media Overlay files is largely a manual process. Consequently, the granularity of the mapping between audio and textual versions of a work is very coarse. For example, a media overlay file may associate the beginning of each paragraph in an e-book with a corresponding location in an audio version of the book. The reason that media overlay files, especially for novels, do not contain a mapping at any finer level of granularity, such as on a word-by-word basis, is that creating such a highly granular media overlay file might take countless hours in human labor.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
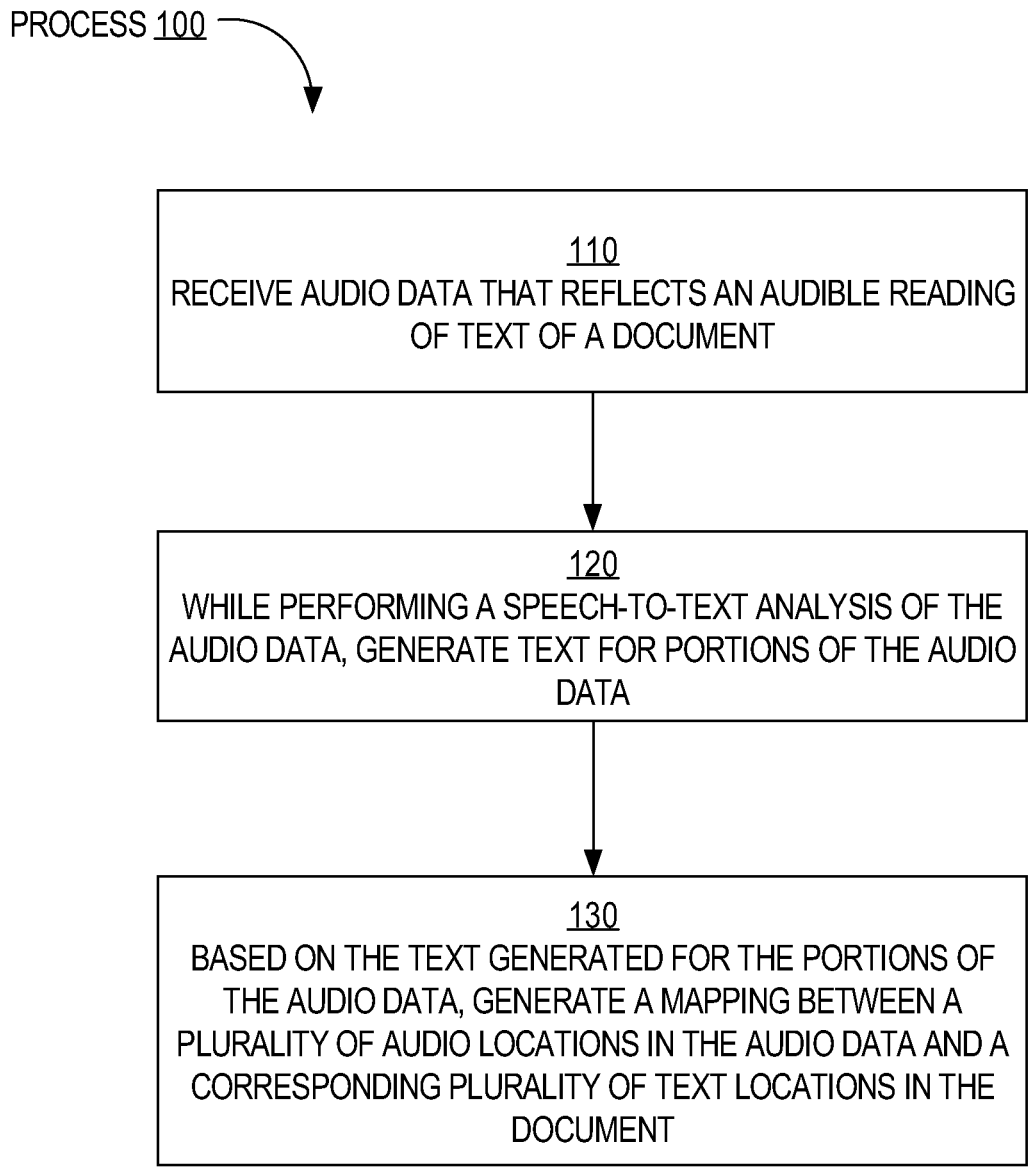
FIG. 1 is a flow diagram that depicts a process for automatically creating a mapping between text data and audio data, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Automatic Generation of Audio-to-Text Mapping

According to one approach, a mapping is automatically created where the mapping maps locations within an audio version of a work (e.g., an audio book) with corresponding locations in a textual version of the work (e.g., an e-book). The mapping is created by performing a speech-to-text analysis on the audio version to identify words reflected in the audio version. The identified words are matched up with the corresponding words in the textual version of the work. The mapping associates locations (within the audio version) of the identified words with locations in the textual version of the work where the identified words are found.

Audio Version Formats

The audio data reflects an audible reading of text of a textual version of a work, such as a book, web page, pamphlet, flyer, etc. The audio data may be stored in one or more audio files. The one or more audio files may be in one of many file formats. Non-limiting examples of audio file formats include AAC, MP3, WAV, and PCM.

Textual Version Formats

Similarly, the text data to which the audio data is mapped may be stored in one of many document file formats. Non-limiting examples of document file formats include DOC, TXT, PDF, RTF, HTML, XHTML, and EPUB.

A typical EPUB document is accompanied by a file that (a) lists each XHTML content document, and (b) indicates an order of the XHTML content documents. For example, if a book comprises 20 chapters, then an EPUB document for that book may have 20 different XHTML documents, one for each chapter. A file that accompanies the EPUB document identifies an order of the XHTML documents that corresponds to the order of the chapters in the book. Thus, a single (logical) document (whether an EPUB document or another type of document) may comprise multiple data items or files.

The words or characters reflected in the text data may be in one or multiple languages. For example, one portion of the text data may be in English while another portion of the text data may be in French. Although examples of English words are provided herein, embodiments of the invention may be applied to other languages, including character-based languages.

Audio and Text Locations in Mapping

As described herein, a mapping comprises a set of mapping records, where each mapping record associates an audio location with a text location.

Each audio location identifies a location in audio data. An audio location may indicate an absolute location within the audio data, a relative location within the audio data, or a combination of an absolute location and a relative location. As an example of an absolute location, an audio location may indicate a time offset (e.g., 04:32:24 indicating 4 hours, 32 minutes, 24 seconds) into the audio data, or a time range, as indicated above in Example A. As an example of a relative location, an audio location may indicate a chapter number, a paragraph number, and a line number. As an example of a combination of an absolute location and a relative location, the audio location may indicate a chapter number and a time offset into the chapter indicated by the chapter number.

Similarly, each text location identifies a location in text data, such as a textual version of a work. A text location may indicate an absolute location within the textual version of the work, a relative location within the textual version of the work, or a combination of an absolute location and a relative location. As an example of an absolute location, a text location may indicate a byte offset into the textual version of the work and/or an "anchor" within the textual version of the work. An anchor is metadata within the text data that identifies a specific location or portion of text. An anchor may be stored separate from the text in the text data that is displayed to an end-user or may be stored among the text that is displayed to an end-user. For example, text data may include the following sentence: "Why did the chicken <i name="123"/>cross the road?" where "<i name="123"/>" is the anchor. When that sentence is displayed to a user, the user only sees "Why did the chicken cross the road?" Similarly, the same sentence may have multiple anchors as follows: "<i name="123"/>Why <i name="124"/>did <i name="125"/>the <i name="126"/>chicken <i name="127"/>cross <i name="128"/>the <i name="129"/>road?" In this example, there is an anchor prior to each word in the sentence.

As an example of a relative location, a text location may indicate a page number, a chapter number, a paragraph number, and/or a line number. As an example of a combination of an absolute location and a relative location, a text location may indicate a chapter number and an anchor into the chapter indicated by the chapter number.

Examples of how to represent a text location and an audio location are provided in the specification entitled "EPUB Media Overlays 3.0," which defines a usage of SMIL (Synchronized Multimedia Integration Language), an EPUB Style Sheet, and an EPUB Content Document. An example of an association that associates a text location with an audio location and that is provided in the specification is as follows:

```
<par>
    <text src="chapter1.xhtml#sentence1"/>
    <audio src="chapter1_audio.mp3" clipBegin="23s" clipEnd="45s"/>
</par>
```

Example A

In Example A, the "par" element includes two child elements: a "text" element and an "audio" element. The text element comprises an attribute "src" that identifies a particular sentence within an XHTML document that contains content from the first chapter of a book. The audio element comprises a "src" attribute that identifies an audio file that contains an audio version of the first chapter of the book, a "clipBegin" attribute that identifies where an audio clip within the audio file begins, and a "clipEnd" attribute that identifies where the audio clip within the audio file ends. Thus, seconds 23 through 45 in the audio file correspond to the first sentence in Chapter 1 of the book.

Creating a Mapping Between Text and Audio

According to an embodiment, a mapping between a textual version of a work and an audio version of the same work is automatically generated. Because the mapping is generated automatically, the mapping may use much finer granularity than would be practical using manual text-to-audio mapping techniques. Each automatically-generated text-to-audio mapping includes multiple mapping records, each of which associates a text location in the textual version with an audio location in the audio version.

FIG. 1 is a flow diagram that depicts a process 100 for automatically creating a mapping between a textual version of a work and an audio version of the same work, according to an embodiment of the invention. At step 110, a speech-to-text analyzer receives audio data that reflects an audible version of the work. At step 120, while the speech-to-text analyzer performs an analysis of the audio data, the speech-to-text analyzer generates text for portions of the audio data. At step 130, based on the text generated for the portions of the audio data, the speech-to-text analyzer generates a mapping between a plurality of audio locations in the audio data and a corresponding plurality of text locations in the textual version of the work.

Step 130 may involve the speech-to-text analyzer comparing the generated text with text in the textual version of the work to determine where, within the textual version of the work, the generated text is located. For each portion of generated text that is found in the textual version of the work, the speech-to-text analyzer associates (1) an audio location that indicates where, within the audio data, the corresponding portion of audio data is found with (2) a text location that indicates where, within the textual version of the work, the portion of text is found.

Textual Context

Every document has a "textual context". The textual context of a textual version of a work includes intrinsic characteristics of the textual version of the work (e.g. the language the textual version of the work is written in, the specific words that textual version of the work uses, the grammar and punctuation that textual version of the work uses, the way the textual version of the work is structured, etc.) and extrinsic characteristics of the work (e.g. the time period in which the work was created, the genre to which the work belongs, the author of the work, etc.)

Different works may have significantly different textual contexts. For example, the grammar used in a classic English novel may be very different that the grammar of modern poetry. Thus, while a certain word order may follow the rules of one grammar, that same word order may violate the rules of another grammar. Similarly, the grammar used in both a classic English novel and modern poetry may differ from the grammar (or lack thereof) employed in a text message sent from one teenager to another.

As mentioned above, one technique described herein automatically creates a fine granularity mapping between the audio version of a work and the textual version of the same work by performing a speech-to-text conversion of the audio version of the work. In an embodiment, the textual context of a work is used to increase the accuracy of the speech-to-text analysis that is performed on the audio version of the work. For example, in order to determine the grammar employed in a work, the speech-to-text analyzer (or another process) may analyze the textual version of the work prior to performing a speech-to-text analysis. The speech-to-text analyzer may then make use of the grammar information thus obtained to increase the accuracy of the speech-to-text analysis of the audio version of the work.

Instead of or in addition to automatically determining the grammar of a work based on the textual version of the work, a user may provide input that identifies one or more rules of grammar that are followed by the author of the work. The rules associated with the identified grammar are input to the speech-to-text analyzer to assist the analyzer in recognizing words in the audio version of the work.

Limiting the Candidate Dictionary Based on Textual Version

Typically, speech-to-text analyzers must be configured or designed to recognize virtually every word in the English language and, optionally, some words in other languages. Therefore, speech-to-text analyzers must have access to a large dictionary of words. The dictionary from which a speech-to-text analyzer selects words during a speech-to-text operation is referred to herein as the "candidate dictionary" of the speech-to-text analyzer. The number of unique words in a typical candidate dictionary is approximately 500,000.

In an embodiment, text from the textual version of a work is taken into account when performing the speech-to-text analysis of the audio version of the work. Specifically, in one embodiment, during the speech-to-text analysis of an audio version of a work, the candidate dictionary used by the speech-to-text analyzer is restricted to the specific set of words that are in the text version of the work. In other words, the only words that are considered to be "candidates" during the speech-to-text operation performed on an audio version of a work are those words that actually appear in the textual version of the work.

By limiting the candidate dictionary used in the speech-to-text translation of a particular work to those words that appear in the textual version of the work, the speech-to-text operation may be significantly improved. For example, assume that the number of unique words in a particular work is 20,000. A conventional speech-to-text analyzer may have difficulty determining to which specific word, of a 500,000 word candidate dictionary, a particular portion of audio corresponds. However, that same portion of audio may unambiguously correspond to one particular word when only the 20,000 unique words that are in the textual version of the work are considered. Thus, with such a much smaller dictionary of possible words, the accuracy of the speech-to-text analyzer may be significantly improved.

Limiting the Candidate Dictionary Based on Current Position

To improve accuracy, the candidate dictionary may be restricted to even fewer words than all of the words in the textual version of the work. In one embodiment, the candidate dictionary is limited to those words found in a particular portion of the textual version of the work. For example, during a speech-to-text translation of a work, it is possible to approximately track the "current translation position" of the translation operation relative to the textual version of the work. Such tracking may be performed, for example, by comparing (a) the text that has been generated during the speech-to-text operation so far, against (b) the textual version of the work.

Once the current translation position has been determined, the candidate dictionary may further restricted based on the current translation position. For example, in one embodiment, the candidate dictionary is limited to only those words that appear, within the textual version of the work, after the current translation position. Thus, words that are found prior to the current translation position, but not thereafter, are effectively removed from the candidate dictionary. Such removal may increase the accuracy of the speech-to-text analyzer, since the smaller the candidate dictionary, the less likely the speech-to-text analyzer will translate a portion of audio data to the wrong word.

As another example, prior to a speech-to-text analysis, an audio book and a digital book may be divided into a number of segments or sections. The audio book may be associated with an audio section mapping and the digital book may be associated with a text section mapping. For example, the audio section mapping and the text section mapping may identify where each chapter begins or ends. These respective mappings may be used by a speech-to-text analyzer to limit the candidate dictionary. For example, if the speech-to-text analyzer determines, based on the audio section mapping, that the speech-to-text analyzer is analyzing the $4^{th}$ chapter of the audio book, then the speech-to-text analyzer uses the text section mapping to identify the $4^{th}$ chapter of the digital book and limit the candidate dictionary to the words found in the $4^{th}$ chapter.

In a related embodiment, the speech-to-text analyzer employs a sliding window that moves as the current translation position moves. As the speech-to-text analyzer is analyzing the audio data, the speech-to-text analyzer moves the sliding window "across" the textual version of the work. The sliding window indicates two locations within the textual version of the work. For example, the boundaries of the sliding window may be (a) the start of the paragraph that precedes the current translation position and (b) the end of the third paragraph after the current translation position. The candidate dictionary is restricted to only those words that appear between those two locations.

While a specific example was given above, the window may span any amount of text within the textual version of the work. For example, the window may span an absolute amount of text, such as 60 characters. As another example, the window may span a relative amount of text from the textual version of the work, such as ten words, three "lines" of text, 2 sentences, or 1 "page" of text. In the relative amount scenario, the speech-to-text analyzer may use formatting data within the textual version of the work to determine how much of the textual version of the work constitutes a line or a page. For example, the textual version of a work may comprise a page indicator (e.g., in the form of an HTML or XML tag) that indicates, within the content of the textual version of the work, the beginning of a page or the ending of a page.

In an embodiment, the start of the window corresponds to the current translation position. For example, the speech-to-text analyzer maintains a current text location that indicates the most recently-matched word in the textual version of the work and maintains a current audio location that indicates the most recently-identified word in the audio data. Unless the narrator (whose voice is reflected in the audio data) misreads text of the textual version of the work, adds his/her own content, or skips portions of the textual version of the work during the recording, the next word that the speech-to-text analyzer detects in the audio data (i.e., after the current audio location) is most likely the next word in the textual version of the work (i.e., after the current text location). Maintaining both locations may significantly increase the accuracy of the speech-to-text translation.

Creating a Mapping Using Audio-to-Audio Correlation

Figure 2:
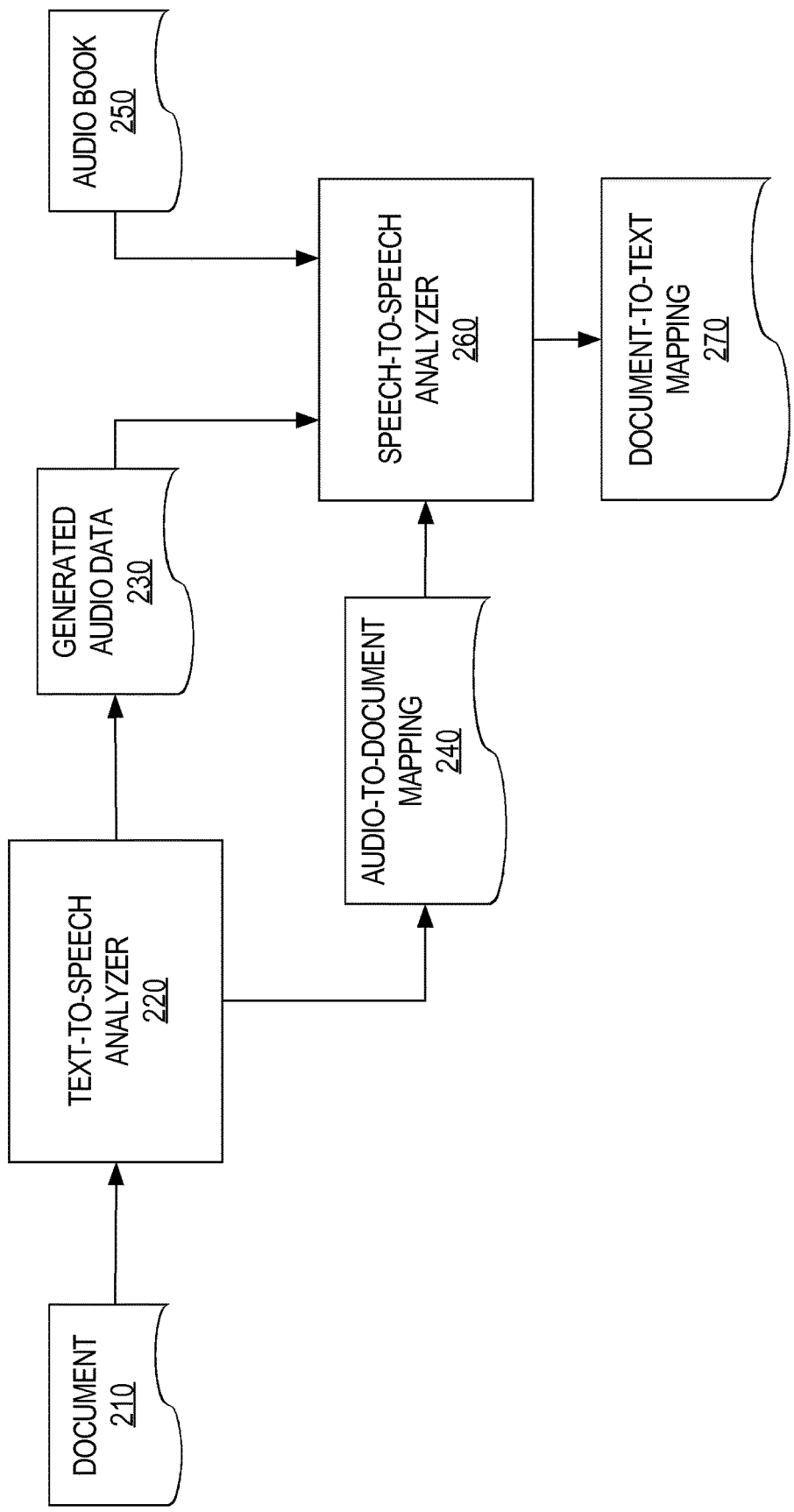
FIG. 2 is a block diagram that depicts a process that involves an audio-to-text correlator in generating a mapping between text data and audio data, according to an embodiment of the invention.

In an embodiment, a text-to-speech generator and an audio-to-text correlator are used to automatically create a mapping between the audio version of a work and the textual version of a work. FIG. 2 is a block diagram that depicts these analyzers and the data used to generate the mapping. Textual version 210 of a work (such as an EPUB document) is input to text-to-speech generator 220. Text-to-speech generator 220 may be implemented in software, hardware, or a combination of hardware and software. Whether implemented in software or hardware, text-to-speech generator 220 may be implemented on a single computing device or may be distributed among multiple computing devices.

Text-to-speech generator 220 generates audio data 230 based on document 210. During the generation of the audio data 230, text-to-speech generator 220 (or another component not shown) creates an audio-to-document mapping 240. Audio-to-document mapping 240 maps, multiple text locations within document 210 to corresponding audio locations within generated audio data 230.

For example, assume that text-to-speech generator 220 generates audio data for a word located at location Y within document 210. Further assume that the audio data that was generated for the work is located at a location X within audio data 230. To reflect the correlation between the location of the word within the document 210 and the location of the corresponding audio in the audio data 230, a mapping would be created between location X and location Y.

Because text-to-speech generator 220 knows where a word or phrase occurs in document 210 when a corresponding word or phrase of audio is generated, each mapping between the corresponding words or phrases can be easily generated.

Audio-to-text correlator 260 accepts, as input, generated audio data 230, audio book 250, and audio-to-document mapping 240. Audio-to-text correlator 260 performs two main steps: an audio-to-audio correlation step and a look-up step. For the audio-to-audio correlation step, audio-to-text correlator 260 compares generated audio data 230 with audio book 250 to determine the correlation between portions of audio data 230 and portions of audio book 250. For example, audio-to-text correlator 260 may determine, for each word represented in audio data 230, the location of the corresponding word in audio book 250.

The granularity at which audio data 230 is divided, for the purpose of establishing correlations, may vary from implementation to implementation. For example, a correlation may be established between each word in audio data 230 and each corresponding word in audio book 250. Alternatively, a correlation may be established based on fixed-duration time intervals (e.g. one mapping for every 1 minute of audio). In yet another alternative, a correlation may be established for portions of audio established based on other criteria, such as at paragraph or chapter boundaries, significant pauses (e.g., silence of greater than 3 seconds), or other locations based on data in audio book 250, such as audio markers within audio book 250.

After a correlation between a portion of audio data 230 and a portion of audio book 250 is identified, audio-to-text correlator 260 uses audio-to-document mapping 240 to identify a text location (indicated in mapping 240) that corresponds to the audio location within generated audio data 230. Audio-to-text correlator 260 then associates the text location with the audio location within audio book 250 to create a mapping record in document-to-audio mapping 270.

For example, assume that a portion of audio book 250 (located at location Z) matches the portion of generated audio data 230 that is located at location X. Based on a mapping record (in audio-to-document mapping 240) that correlates location X to location Y within document 210, a mapping record in document-to-audio mapping 270 would be created that correlates location Z of the audio book 250 with location Y within document 210.

Audio-to-text correlator 260 repeatedly performs the audio-to-audio correlation and look-up steps for each portion of audio data 230. Therefore, document-to-audio mapping 270 comprises multiple mapping records, each mapping record mapping a location within document 210 to a location within audio book 250.

In an embodiment, the audio-to-audio correlation for each portion of audio data 230 is immediately followed by the look-up step for that portion of audio. Thus, document-to-audio mapping 270 may be created for each portion of audio data 230 prior to proceeding to the next portion of audio data 230. Alternatively, the audio-to-audio correlation step may be performed for many or for all of the portions of audio data 230 before any look-up step is performed. The look-up steps for all portions can be performed in a batch, after all of the audio-to-audio correlations have been established.

Mapping Granularity

A mapping has a number of attributes, one of which is the mapping's size, which refers to the number of mapping records in the mapping. Another attribute of a mapping is the mapping's "granularity." The "granularity" of a mapping refers to the number of mapping records in the mapping relative to the size of the digital work. Thus, the granularity of a mapping may vary from one digital work to another digital work. For example, a first mapping for a digital book that comprises 200 "pages" includes a mapping record only for each paragraph in the digital book. Thus, the first mapping may comprise 1000 mapping records. On the other hand, a second mapping for a digital "children's" book that comprises 20 pages includes a mapping record for each word in the children's book. Thus, the second mapping may comprise 800 mapping records. Even though the first mapping comprises more mapping records than the second mapping, the granularity of the second mapping is finer than the granularity of the first mapping.

In an embodiment, the granularity of a mapping may be dictated based on input to a speech-to-text analyzer that generates the mapping. For example, a user may specify a specific granularity before causing a speech-to-text analyzer to generate a mapping. Non-limiting examples of specific granularities include:

word granularity (i.e., an association for each word),
sentence granularity (i.e., an association for each sentence),
paragraph granularity (i.e., an association for each paragraph),
10-word granularity (i.e., a mapping for each 10 word portion in the digital work), and
10-second granularity (i.e., a mapping for each 10 seconds of audio).

As another example, a user may specify the type of digital work (e.g., novel, children's book, short story) and the speech-to-text analyzer (or another process) determines the granularity based on the work's type. For example, a children's book may be associated with word granularity while a novel may be associated with sentence granularity.

The granularity of a mapping may even vary within the same digital work. For example, a mapping for the first three chapters of a digital book may have sentence granularity while a mapping for the remaining chapters of the digital book have word granularity.

On-the-Fly Mapping Generation During Text-to-Audio Transitions

While an audio-to-text mapping will, in many cases, be generated prior to a user needing to rely on one, in one embodiment, an audio-to-text mapping is generated at runtime or after a user has begun to consume the audio data and/or the text data on the user's device. For example, a user reads a textual version of a digital book using a tablet computer. The tablet computer keeps track of the most recent page or section of the digital book that the tablet computer has displayed to the user. The most recent page or section is identified by a "text bookmark."

Later, the user selects to play an audio book version of the same work. The playback device may be the same tablet computer on which the user was reading the digital book or another device. Regardless of the device upon which the audio book is to be played, the text bookmark is retrieved, and a speech-to-text analysis is performed relative to at least a portion of the audio book. During the speech-to-text analysis, "temporary" mapping records are generated to establish a correlation between the generated text and the corresponding locations within the audio book.

Once the text and correlation records have been generated, a text-to-text comparison is used to determine the generated text that corresponds to the text bookmark. Then, the temporary mapping records are used to identify the portion of the audio book that corresponds to the portion of generated text that corresponds to the text bookmark. Playback of the audio book is then initiated from that position.

The portion of the audio book on which the speech-to-text analysis is performed may be limited to the portion that corresponds to the text bookmark. For example, an audio section mapping may already exist that indicates where certain portions of the audio book begin and/or end. For example, an audio section mapping may indicate where each chapter begins, where one or more pages begin, etc. Such an audio section mapping may be helpful to determine where to begin the speech-to-text analysis so that a speech-to-text analysis on the entire audio book is not required to be performed. For example, if the text bookmark indicates a location within the $12^{th}$ chapter of the digital book and an audio section mapping associated with the audio data identifies where the $12^{th}$ chapter begins in the audio data, then a speech-to-text analysis is not required to be performed on any of the first 11 chapters of the audio book. For example, the audio data may consist of 20 audio files, one audio file for each chapter. Therefore, only the audio file that corresponds to the $12^{th}$ chapter is input to a speech-to-text analyzer.

On-the-Fly Mapping Generation During Audio-to-Text Transitions

Mapping records can be generated on-the-fly to facilitate audio-to-text transitions, as well as text-to-audio transitions. For example, assume that a user is listening to an audio book using a smart phone. The smart phone keeps track of the current location within the audio book that is being played. The current location is identified by an "audio bookmark." Later, the user picks up a tablet computer and selects a digital book version of the audio book to display. The tablet computer receives the audio bookmark (e.g., from a central server that is remote relative to the tablet computer and the smart phone), performs a speech-to-text analysis of at least a portion of the audio book, and identifies, within the audio book, a portion that corresponds to a portion of text within a textual version of the audio book that corresponds to the audio bookmark. The tablet computer then begins displaying the identified portion within the textual version.

The portion of the audio book on which the speech-to-text analysis is performed may be limited to the portion that corresponds to the audio bookmark. For example, a speech-to-text analysis is performed on a portion of the audio book that spans one or more time segments (e.g., seconds) prior to the audio bookmark in the audio book and/or one or more time segments after the audio bookmark in the audio book. The text produced by the speech-to-text analysis on that portion is compared to text in the textual version to locate where the series of words or phrases in the produced text match text in the textual version.

If there exists a text section mapping that indicates where certain portions of the textual version begin or end and the audio bookmark can be used to identify a section in the text section mapping, then much of the textual version need not be analyzed in order to locate where the series of words or phrases in the produced text match text in the textual version. For example, if the audio bookmark indicates a location within in the $3^{rd}$ chapter of the audio book and a text section mapping associated with the digital book identifies where the $3^{rd}$ chapter begins in the textual version, then a speech-to-text analysis is not required to be performed on any of the first two chapters of the audio book or on any of the chapters of the audio book after the $3^{rd}$ chapter.

Overview of Use of Audio-to-Text Mappings

According to one approach, a mapping (whether created manually or automatically) is used to identify the locations within an audio version of a digital work (e.g., an audio book) that correspond to locations within a textual version of the digital work (e.g., an e-book). For example, a mapping may be used to identify a location within an e-book based on a "bookmark" established in an audio book. As another example, a mapping may be used to identify which displayed text corresponds to an audio recording of a person reading the text as the audio recording is being played and cause the identified text to be highlighted. Thus, while an audio book is being played, a user of an e-book reader may follow along as the e-book reader highlights the corresponding text. As another example, a mapping may be used to identify a location in audio data and play audio at that location in response to input that selects displayed text from an e-book. Thus, a user may select a word in an e-book, which selection causes audio that corresponds to that word to be played. As another example, a user may create an annotation while "consuming" (e.g., reading or listening to) one version of a digital work (e.g., an e-book) and cause the annotation to be consumed while the user is consuming another version of the digital work (e.g., an audio book). Thus, a user can make notes on a "page" of an e-book and may view those notes while listening to an audio book of the e-book. Similarly, a user can make a note while listening to an audio book and then can view that note when reading the corresponding e-book.

Figure 3:
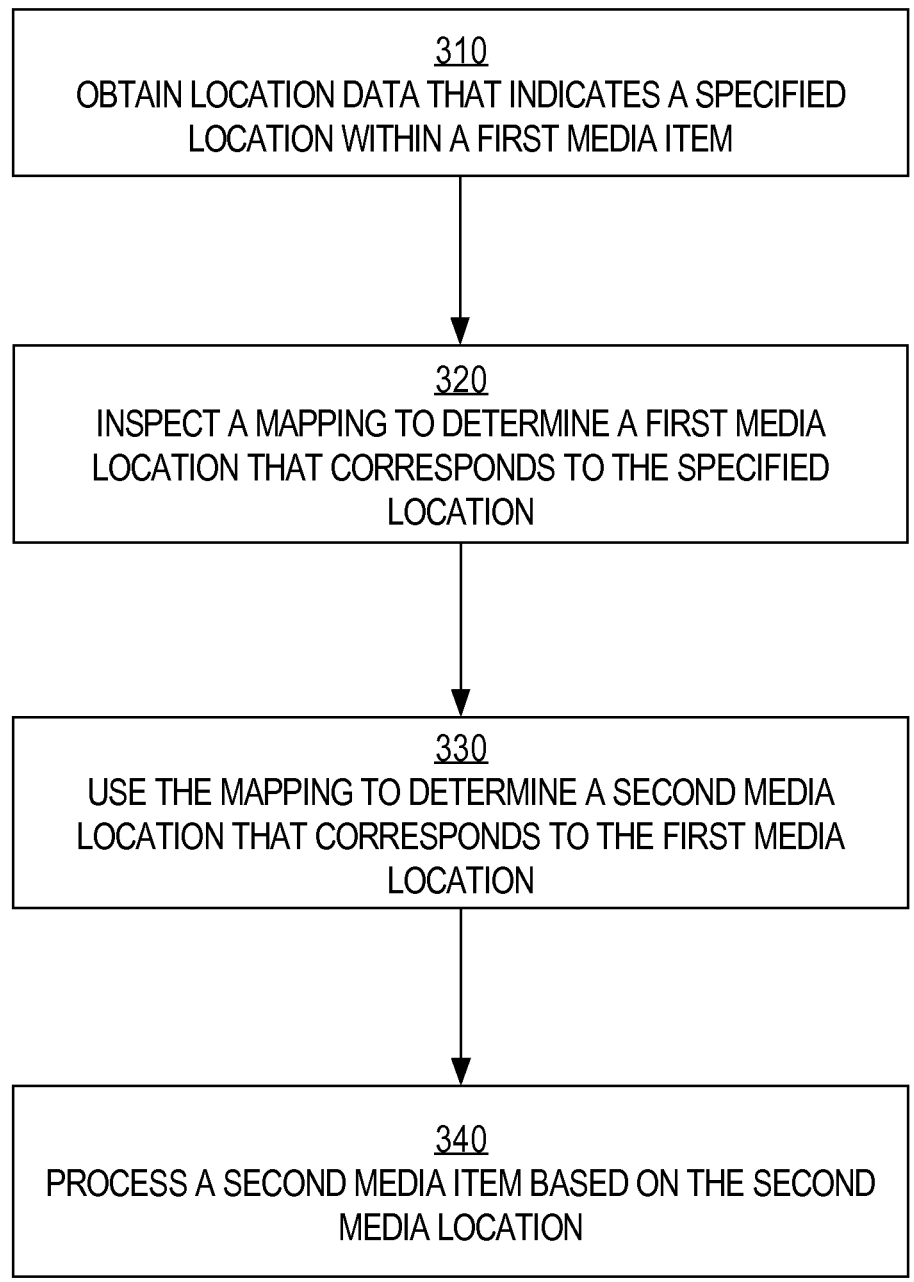
FIG. 3 is a flow diagram that depicts a process for using a mapping in one or more of these scenarios, according to an embodiment of the invention.

FIG. 3 is a flow diagram that depicts a process for using a mapping in one or more of these scenarios, according to an embodiment of the invention.

At step 310, location data that indicates a specified location within a first media item is obtained. The first media item may be a textual version of a work or audio data that corresponds to a textual version of the work. This step may be performed by a device (operated by a user) that consumes the first media item. Alternatively, the step may be performed by a server that is located remotely relative to the device that consumes the first media item. Thus, the device sends the location data to the server over a network using a communication protocol.

At step 320, a mapping is inspected to determine a first media location that corresponds to the specified location. Similarly, this step may be performed by a device that consumes the first media item or by a server that is located remotely relative to the device.

At step 330, a second media location that corresponds to the first media location and that is indicated in the mapping is determined. For example, if the specified location is an audio "bookmark", then the first media location is an audio location indicated in the mapping and the second media location is a text location that is associated with the audio location in the mapping. Similarly, For example, if the specified location is a text "bookmark", then the first media location is a text location indicated in the mapping and the second media location is an audio location that is associated with the text location in the mapping.

At step 340, the second media item is processed based on the second media location. For example, if the second media item is audio data, then the second media location is an audio location and is used as a current playback position in the audio data. As another example, if the second media item is a textual version of a work, then the second media location is a text location and is used to determine which portion of the textual version of the work to display.

Examples of using process 300 in specific scenarios are provided below.

Architecture Overview

Figure 4:
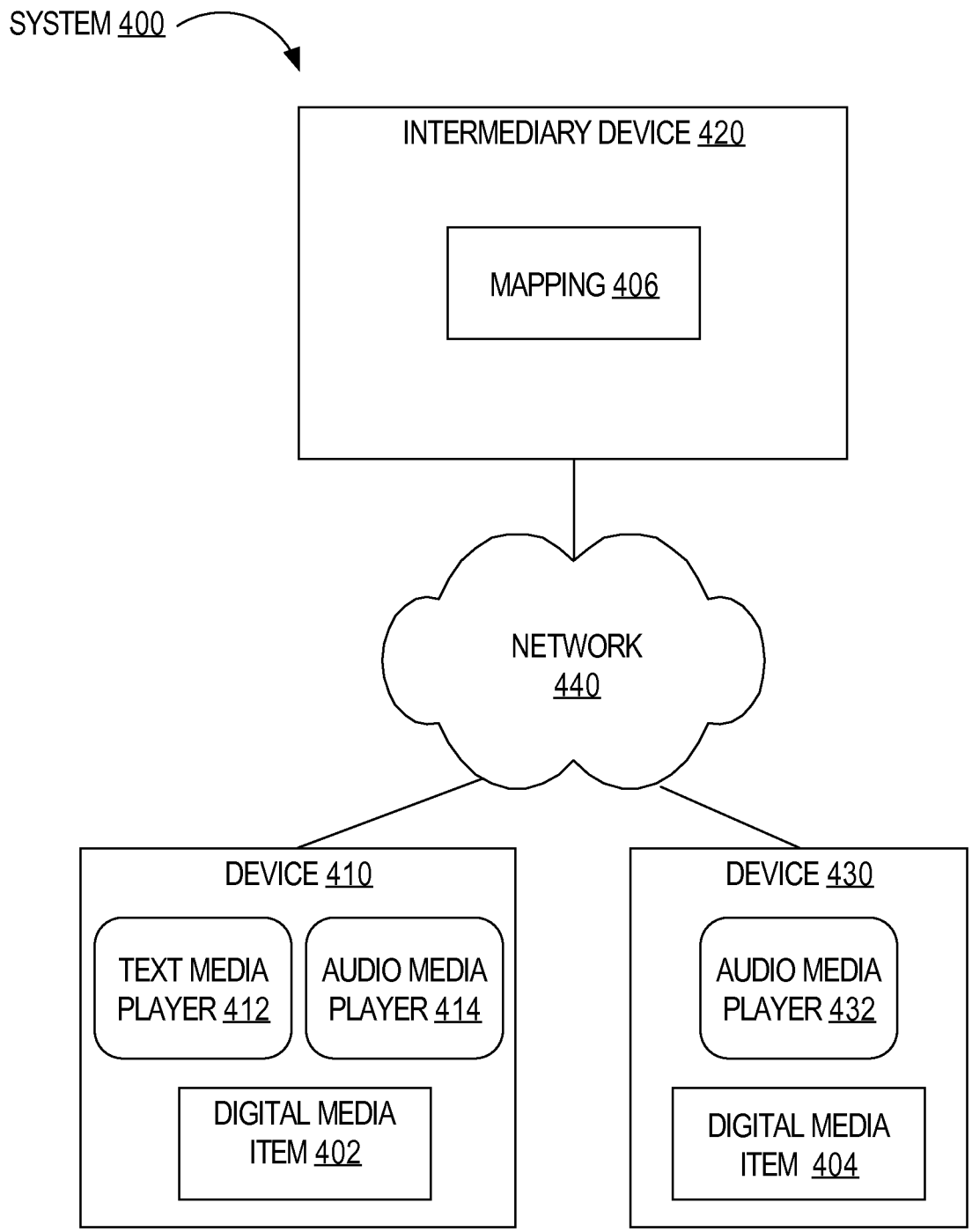
FIG. 4 is a block diagram that an example system 400 that may be used to implement some of the processes described herein, according to an embodiment of the invention.

Each of the example scenarios mentioned above and described in detail below may involve one or more computing devices. FIG. 4 is a block diagram that an example system 400 that may be used to implement some of the processes described herein, according to an embodiment of the invention. System 400 includes end-user device 410, intermediary device 420, and end-user device 430. Non-limiting examples of end-user devices 410 and 430 include desktop computers, laptop computers, smart phones, tablet computers, and other handheld computing devices.

As depicted in FIG. 4, device 410 stores a digital media item 402 and executes a text media player 412 and an audio media player 414. Text media player 412 is configured to process electronic text data and cause device 410 to display text (e.g., on a touch screen of device 410, not shown). Thus, if digital media item 402 is an e-book, then text media player 412 may be configured to process digital media item 402, as long as digital media item 402 is in a text format that text media player 412 is configured to process. Device 410 may execute one or more other media players (not shown) that are configured to process other types of media, such as video.

Similarly, audio media player 414 is configured to process audio data and cause device 410 to generate audio (e.g., via speakers on device 410, not shown). Thus, if digital media item 402 is an audio book, then audio media player 414 may be configured to process digital media item 402, as long as digital media item 402 is in an audio format that audio media player 414 is configured to process. Whether item 402 is an e-book or an audio book, item 402 may comprise multiple files, whether audio files or text files.

Device 430 similarly stores a digital media item 404 and executes an audio media player 432 that is configured to process audio data and cause device 430 to generate audio. Device 430 may execute one or more other media players (not shown) that are configured to process other types of media, such as video and text.

Intermediary device 420 stores a mapping 406 that maps audio locations within audio data to text location in text data. For example, mapping 406 may map audio locations within digital media item 404 to text locations within digital media item 402. Although not depicted in FIG. 4, intermediary device 420 may store many mappings, one for each corresponding set of audio data and text data. Also, intermediary device 420 may interact with many end-user devices not shown.

Also, intermediary device 420 may store digital media items that users may access via their respective devices. Thus, instead of storing a local copy of a digital media item, a device (e.g., device 430) may request the digital media item from intermediary device 420.

Additionally, intermediary device 420 may store account data that associates one or more devices of a user with a single account. Thus, such account data may indicate that devices 410 and 430 are registered by the same user under the same account. Intermediary device 420 may also store account-item association data that associates an account with one or more digital media items owned (or purchased) by a particular user. Thus, intermediary device 420 may verify that device 430 may access a particular digital media item by determining whether the account-item association data indicates that device 430 and the particular digital media item are associated with the same account.

Although only two end-user devices are depicted, an end-user may own and operate more or less devices that consume digital media items, such as e-books and audio books. Similarly, although only a single intermediary device 420 is depicted, the entity that owns and operates intermediary device 420 may operate multiple devices, each of which provide the same service or may operate together to provide a service to the user of end-user devices 410 and 430.

Communication between intermediary device 420 and end-user devices 410 and 430 is made possible via network 440. Network 440 may be implemented by any medium or mechanism that provides for the exchange of data between various computing devices. Examples of such a network include, without limitation, a network such as a Local Area Network (LAN), Wide Area Network (WAN), Ethernet or the Internet, or one or more terrestrial, satellite, or wireless links. The network may include a combination of networks such as those described. The network may transmit data according to Transmission Control Protocol (TCP), User Datagram Protocol (UDP), and/or Internet Protocol (IP).

Storage Location of Mapping

A mapping may be stored separate from the text data and the audio data from which the mapping was generated. For example, as depicted in FIG. 4, mapping 406 is stored separate from digital media items 402 and 404 even though mapping 406 may be used to identify a media location in one digital media item based on a media location in the other digital media item. In fact, mapping 406 is stored on a separate computing device (intermediary device 420) than devices 410 and 430 that store, respectively, digital media items 402 and 404.

Additionally or alternatively, a mapping may be stored as part of the corresponding text data. For example, mapping 406 may be stored in digital media item 402. However, even if the mapping is stored as part of the text data, the mapping may not be displayed to an end-user that consumes the text data. Additionally or alternatively still, a mapping may be stored as part of the audio data. For example, mapping 406 may be stored in digital media item 404.

Bookmark Switching

"Bookmark switching" refers to establishing a specified location (or "bookmark") in one version of a digital work and using the bookmark to find the corresponding location within another version of the digital work. There are two types of bookmark switching: text-to-audio (TA) bookmark switching and audio-to-text (AT) bookmark switching. TA bookmark switching involves using a text bookmark established in an e-book to identify a corresponding audio location in an audio book. Conversely, another type of bookmark switching referred to herein as AT bookmark switching involves using an audio bookmark established in an audio book to identify a corresponding text location within an e-book.

Text-to-Audio Bookmark Switching

Figure 5A:
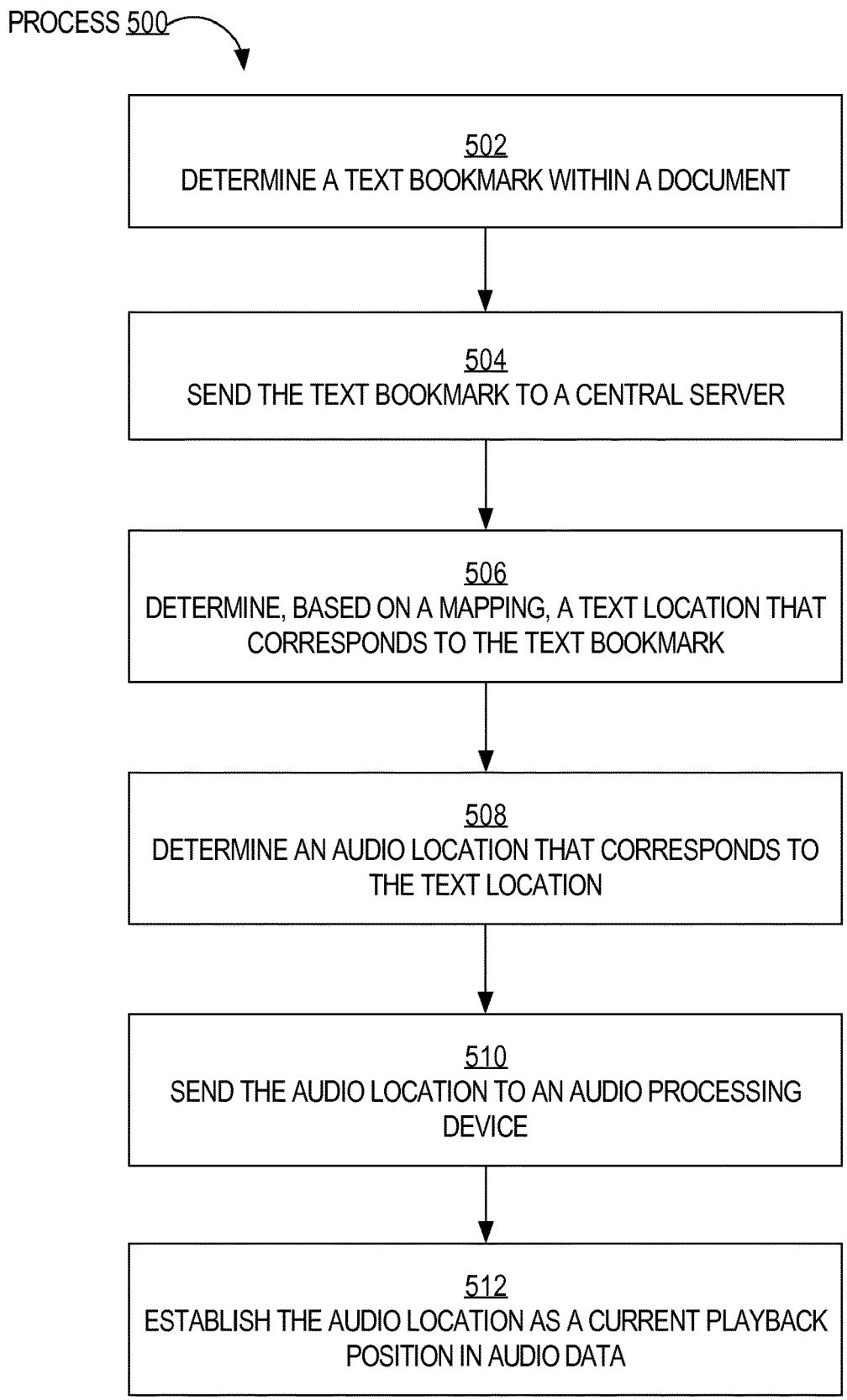
FIGS. 5A-B are flow diagrams that depict processes for bookmark switching, according to an embodiment of the invention.

FIG. 5A is a flow diagram that depicts a process 500 for TA bookmark switching, according to an embodiment of the invention. FIG. 5A is described using elements of system 400 depicted in FIG. 4.

At step 502, a text media player 412 (e.g., an e-reader) determines a text bookmark within digital media item 402 (e.g., a digital book). Device 410 displays content from digital media item 402 to a user of device 410.

The text bookmark may be determined in response to input from the user. For example, the user may touch an area on a touch screen of device 410. Device 410's display, at or near that area, displays one or more words. In response to the input, the text media player 412 determines the one or more words that are closest to the area. The text media player 412 determines the text bookmark based on the determined one or more words.

Alternatively, the text bookmark may be determined based on the last text data that was displayed to the user. For example, the digital media item 402 may comprise 200 electronic "pages" and page 110 was the last page that was displayed. Text media player 412 determines that page 110 was the last page that was displayed. Text media player 412 may establish page 110 as the text bookmark or may establish a point at the beginning of page 110 as the text bookmark, since there may be no way to know where the user stopped reading. It may be safe to assume that the user at least read the last sentence on page 109, which sentence may have ended on page 109 or on page 110. Therefore, the text media player 412 may establish the beginning of the next sentence (which begins on page 110) as the text bookmark. However, if the granularity of the mapping is at the paragraph level, then text media player 412 may establish the beginning of the last paragraph on page 109. Similarly, if the granularity of the mapping is at the sentence level, then text media player 412 may establish the beginning of the chapter that includes page 110 as the text bookmark.

At step 504, text media player 412 sends, over network 440 to intermediary device 420, data that indicates the text bookmark. Intermediary device 420 may store the text bookmark in association with device 410 and/or an account of the user of device 410. Previous to step 502, the user may have established an account with an operator of intermediary device 420. The user then registered one or more devices, including device 410, with the operator. The registration caused each of the one or more devices to be associated with the user's account.

One or more factors may cause the text media player 412 to send the text bookmark to intermediary device 420. Such factors may include the exiting (or closing down) of text media player 412, the establishment of the text bookmark by the user, or an explicit instruction by the user to save the text bookmark for use when listening to the audio book that corresponds to the textual version of the work for which the text bookmark is established.

As noted previously, intermediary device 420 has access to (e.g., stores) mapping 406, which, in this example, maps multiple audio locations in digital media item 404 with multiple text locations within digital media item 402.

At step 506, intermediary device 420 inspects mapping 406 to determine a particular text location, of the multiple text locations, that corresponds to the text bookmark. The text bookmark may not exactly match any of the multiple text locations in mapping 406. However, intermediary device 420 may select the text location that is closest to the text bookmark. Alternatively, intermediary device 420 may select the text location that is immediately before the text bookmark, which text location may or may not be the closest text location to the text bookmark. For example, if the text bookmark indicates 5$^{th}$ chapter, 3$^{rd}$ paragraph, 5$^{th}$ sentence and the closest text locations in mapping 406 are (1) 5$^{th}$ chapter, 3$^{rd}$ paragraph, 1$^{st}$ sentence and (2), 5$^{th}$ chapter, 3$^{rd}$ paragraph, 6$^{th}$ sentence, then the text location (1) is selected.

At step 508, once the particular text location in the mapping is identified, intermediary device 420 determines a particular audio location, in mapping 406, that corresponds to the particular text location.

At step 510, intermediary device 420 sends the particular audio location to device 430, which, in this example, is different than device 410. For example, device 410 may be a tablet computer and the device 430 may be a smart phone. In a related embodiment, device 430 is not involved. Thus, intermediary device 420 may send the particular audio location to device 410.

Step 510 may be performed automatically, i.e., in response to intermediary device 420 determining the particular audio location. Alternatively, step 510 or step 506) may be performed in response to receiving, from device 430, an indication that device 430 is about to process digital media item 404. The indication may be a request for an audio location that corresponds to the text bookmark.

At step 512, audio media player 432 establishes the particular audio location as a current playback position of the audio data in digital media item 404. This establishment may be performed in response to receiving the particular audio location from intermediary device 420. Because the current playback position becomes the particular audio location, audio media player 432 is not required to play any of the audio that precedes the particular audio location in the audio data. For example, if the particular audio location indicates 2:56:03 (2 hours, 56 minutes, and 3 seconds), then audio media player 432 establishes that time in the audio data as the current playback position. Thus, if the user of device 430 selects a "play" button (whether graphical or physical) on device 430, then audio media player 430 begins processing the audio data at that 2:56:03 mark.

In an alternative embodiment, device 410 stores mapping 406 (or a copy thereof). Therefore, in place of steps 504-508, text media player 412 inspects mapping 406 to determine a particular text location, of the multiple text locations, that corresponds to the text bookmark. Then, text media player 412 determines a particular audio location, in mapping 406, that corresponds to the particular text location. The text media player 412 may then cause the particular audio location to be sent to intermediary device 420 to allow device 430 to retrieve the particular audio location and establish a current playback position in the audio data to be the particular audio location. Text media player 412 may also cause the particular text location (or text bookmark) to be sent to intermediary device 420 to allow device 410 (or another device, not shown) to later retrieve the particular text location to allow another text media player executing on the other device to display a portion (e.g., a page) of another copy of digital media item 402, where the portion corresponds to the particular text location.

In another alternative embodiment, intermediary device 420 and device 430 are not involved. Thus, steps 504 and 510 are not performed. Thus, device 410 performs all other steps in FIG. 5A, including steps 506 and 508.

Audio-to-Text Bookmark Switching

Figure 5B:
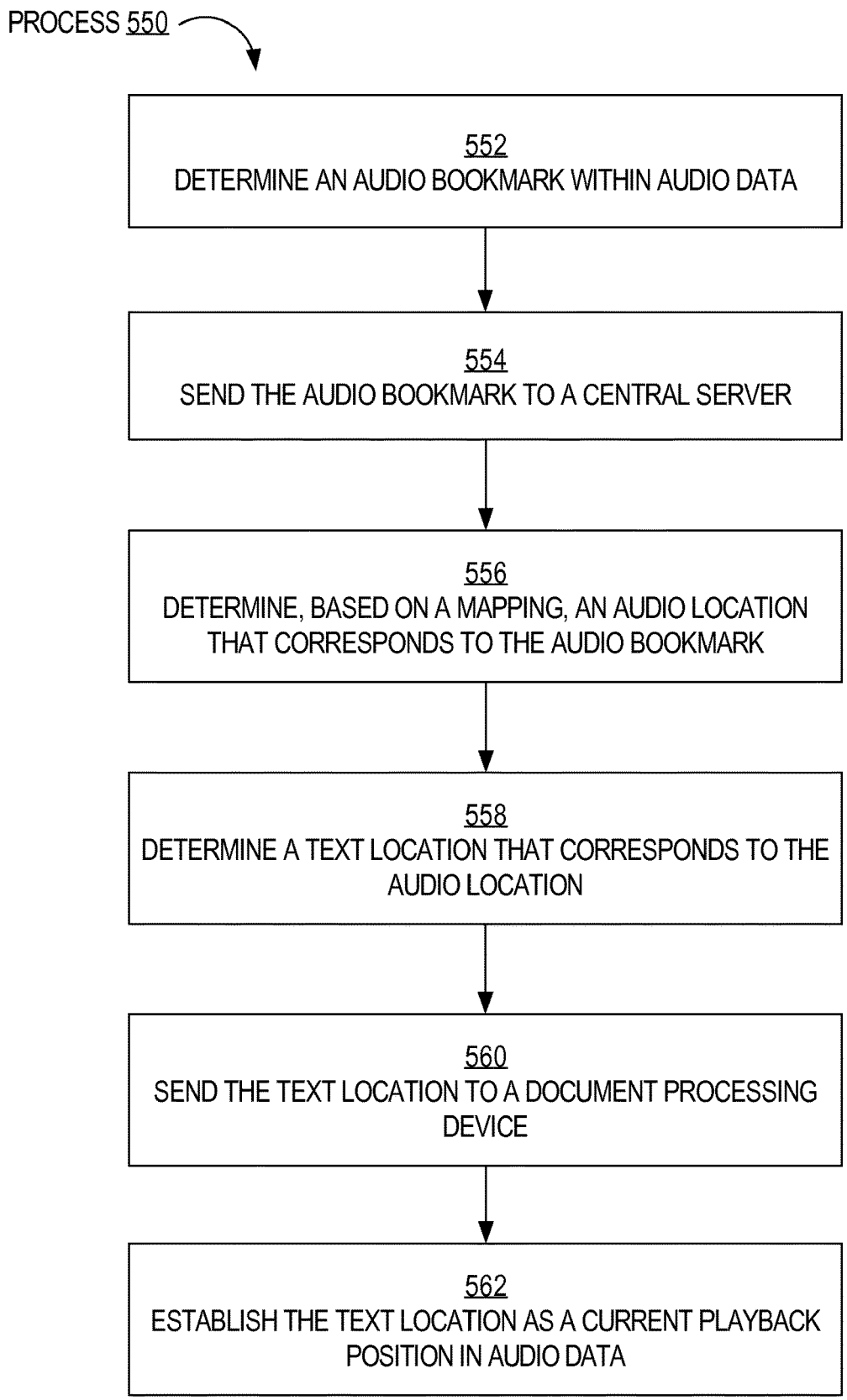

FIG. 5B is a flow diagram that depicts a process 550 for AT bookmark switching, according to an embodiment of the invention. Similarly to FIG. 5A, FIG. 5B is described using elements of system 400 depicted in FIG. 4.

At step 552, audio media player 432 determines an audio bookmark within digital media item 404 (e.g., an audio book).

The audio bookmark may be determined in response to input from the user. For example, the user may stop the playback of the audio data, for example, by selecting a "stop" button that is displayed on a touch screen of device 430. Audio media player 432 determines the location within audio data of digital media item 404 that corresponds to where playback stopped. Thus, the audio bookmark may simply be the last place where the user stopped listening to the audio generated from digital media item 404. Additionally or alternatively, the user may select one or more graphical buttons on the touch screen of device 430 to establish a particular location within digital media item 404 as the audio bookmark. For example, device 430 displays a timeline that corresponds to the length of the audio data in digital media item 404. The user may select a position on the timeline and then provide one or more additional inputs that are used by audio media player 432 to establish the audio bookmark.

At step 554, device 430 sends, over network 440 to intermediary device 420, data that indicates the audio bookmark. The intermediary device 420 may store the audio bookmark in association with device 430 and/or an account of the user of device 430. Previous to step 552, the user established an account with an operator of intermediary device 420. The user then registered one or more devices, including device 430, with the operator. The registration caused each of the one or more devices to be associated with the user's account.

Intermediary device 420 also has access to (e.g., stores) mapping 406. Mapping 406 maps multiple audio locations in the audio data of digital media item 404 with multiple text locations within text data of digital media item 402.

One or more factors may cause audio media player 432 to send the audio bookmark to intermediary device 420. Such factors may include the exiting (or closing down) of audio media player 432, the establishment of the audio bookmark by the user, or an explicit instruction by the user to save the audio bookmark for use when displaying portions of the textual version of the work (reflected in digital media item 402) that corresponds to digital media item 404, for which the audio bookmark is established.

At step 556, intermediary device 420 inspects mapping 406 to determine a particular audio location, of the multiple audio locations, that corresponds to the audio bookmark. The audio bookmark may not exactly match any of the multiple audio locations in mapping 406. However, intermediary device 420 may select the audio location that is closest to the audio bookmark. Alternatively, intermediary device 420 may select the audio location that is immediately before the audio bookmark, which audio location may or may not be the closest audio location to the audio bookmark. For example, if the audio bookmark indicates 02:43:19 (or 2 hours, 43 minutes, and 19 seconds) and the closest audio locations in mapping 406 are (1) 02:41:07 and (2), 0:43:56, then the audio location (1) is selected, even though audio location (2) is closest to the audio bookmark.

At step 558, once the particular audio location in the mapping is identified, intermediary device 420 determines a particular text location, in mapping 406, that corresponds to the particular audio location.

At step 560, intermediary device 420 sends the particular text location to device 410, which, in this example, is different than device 430. For example, device 410 may be a tablet computer and device 430 may be a smart phone that is configured to process audio data and generate audible sounds.

Step 560 may be performed automatically, i.e., in response to intermediary device 420 determining the particular text location. Alternatively, step 560 (or step 556) may be performed in response to receiving, from device 410, an indication that device 410 is about to process the digital media item 402. The indication may be a request for a text location that corresponds to the audio bookmark.

At step 562, text media player 412 displays information about the particular text location. Step 562 may be performed in response to receiving the particular text location from intermediary device 420. Device 410 is not required to display any of the content that precedes the particular text location in the textual version of the work reflected in digital media item 402. For example, if the particular text location indicates Chapter 3, paragraph 2, sentence 4, then device 410 displays a page that includes that sentence. Text media player 412 may cause a marker to be displayed at the particular text location in the page that visually indicates, to a user of device 410, where to begin reading in the page. Thus, the user is able to immediately read the textual version of the work beginning at a location that corresponds to the last words spoken by a narrator in the audio book.

In an alternative embodiment, the device 410 stores mapping 406. Therefore, in place of steps 556-560, after step 554 (wherein the device 430 sends data that indicates the audio bookmark to intermediary device 420), intermediary device 420 sends the audio bookmark to device 410. Then, text media player 412 inspects mapping 406 to determine a particular audio location, of the multiple audio locations, that corresponds to the audio bookmark. Then, text media player 412 determines a particular text location, in mapping 406, that corresponds to the particular audio location. This alternative process then proceeds to step 562, described above.

In another alternative embodiment, intermediary device 420 is not involved. Thus, steps 554 and 560 are not performed. Thus, device 430 performs all other steps in FIG. 5B, including steps 556 and 558.

Highlight Text in Response to Playing Audio

In an embodiment, text from a portion of a textual version of a work is highlighted or "lit up" while audio data that corresponds to the textual version of the work is played. As noted previously, the audio data is an audio version of a textual version of the work and may reflect a reading, of text from the textual version, by a human user. As used herein, "highlighting" text refers to a media player (e.g., an "e-reader") visually distinguishing that text from other text that is concurrently displayed with the highlighted text. Highlighting text may involve changing the font of the text, changing the font style of the text (e.g., italicize, bold, underline), changing the size of the text, changing the color of the text, changing the background color of the text, or creating an animation associated with the text. An example of creating an animation is causing the text (or background of the text) to blink on and off or to change colors. Another example of creating an animation is creating a graphic to appear above, below, or around the text. For example, in response to the word "toaster" being played and detected by a media player, the media player displays a toaster image above the word "toaster" in the displayed text. Another example of an animation is a bouncing ball that "bounces" on a portion of text (e.g., word, syllable, or letter) when that portion is detected in audio data that is played.

Figure 6:
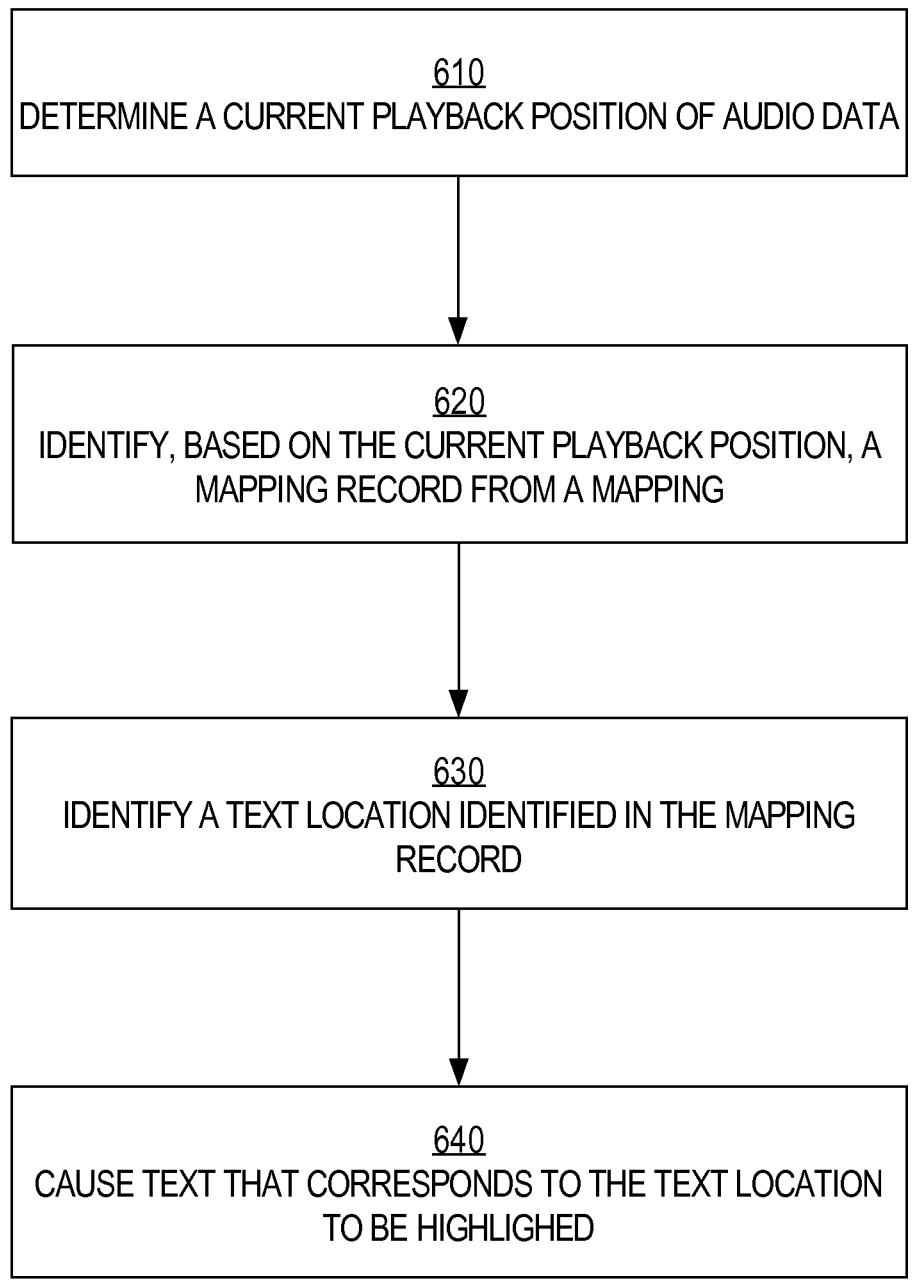
FIG. 6 is a flow diagram that depicts a process for causing text, from a textual version of a work, to be highlighted while an audio version of the work is being played, according to an embodiment of the invention.

FIG. 6 is a flow diagram that depicts a process 600 for causing text, from a textual version of a work, to be highlighted while an audio version of the work is being played, according to an embodiment of the invention.

At step 610, the current playback position (which is constantly changing) of audio data of the audio version is determined. This step may be performed by a media player executing on a user's device. The media player processes the audio data to generate audio for the user.

At step 620, based on the current playback position, a mapping record in a mapping is identified. The current playback position may match or nearly match the audio location identified in the mapping record.

Step 620 may be performed by the media player if the media player has access to a mapping that maps multiple audio locations in the audio data with multiple text locations in the textual version of the work. Alternatively, step 620 may be performed by another process executing on the user's device or by a server that receives the current playback position from the user's device over a network.

At step 630, the text location identified in the mapping record is identified.

At step 640, a portion of the textual version of the work that corresponds to the text location is caused to be highlighted. This step may be performed by the media player or another software application executing on the user's device. If a server performs the look-up steps (620 and 630), then step 640 may further involve the server sending the text location to the user's device. In response, the media player, or another software application, accepts the text location as input and causes the corresponding text to be highlighted.

In an embodiment, different text locations that are identified, by the media player, in the mapping are associated with different types of highlighting. For example, one text location in the mapping may be associated with the changing of the font color from black to red while another text location in the mapping may be associated with an animation, such as a toaster graphic that shows a piece of toast "popping" out of toaster. Therefore, each mapping record in the mapping may include "highlighting data" that indicates how the text identified by the corresponding text location is to be highlighted. Thus, for each mapping record in the mapping that the media player identifies and that includes highlighting data, the media player uses the highlighting data to determine how to highlight the text. If a mapping record does not include highlighting data, then the media player may not highlight the corresponding text. Alternatively, if an mapping record in the mapping does not include highlighting data, then the media player may use a "default" highlight technique (e.g., bolding the text) to highlight the text.

Highlighting Text Based on Audio Input

Figure 7:
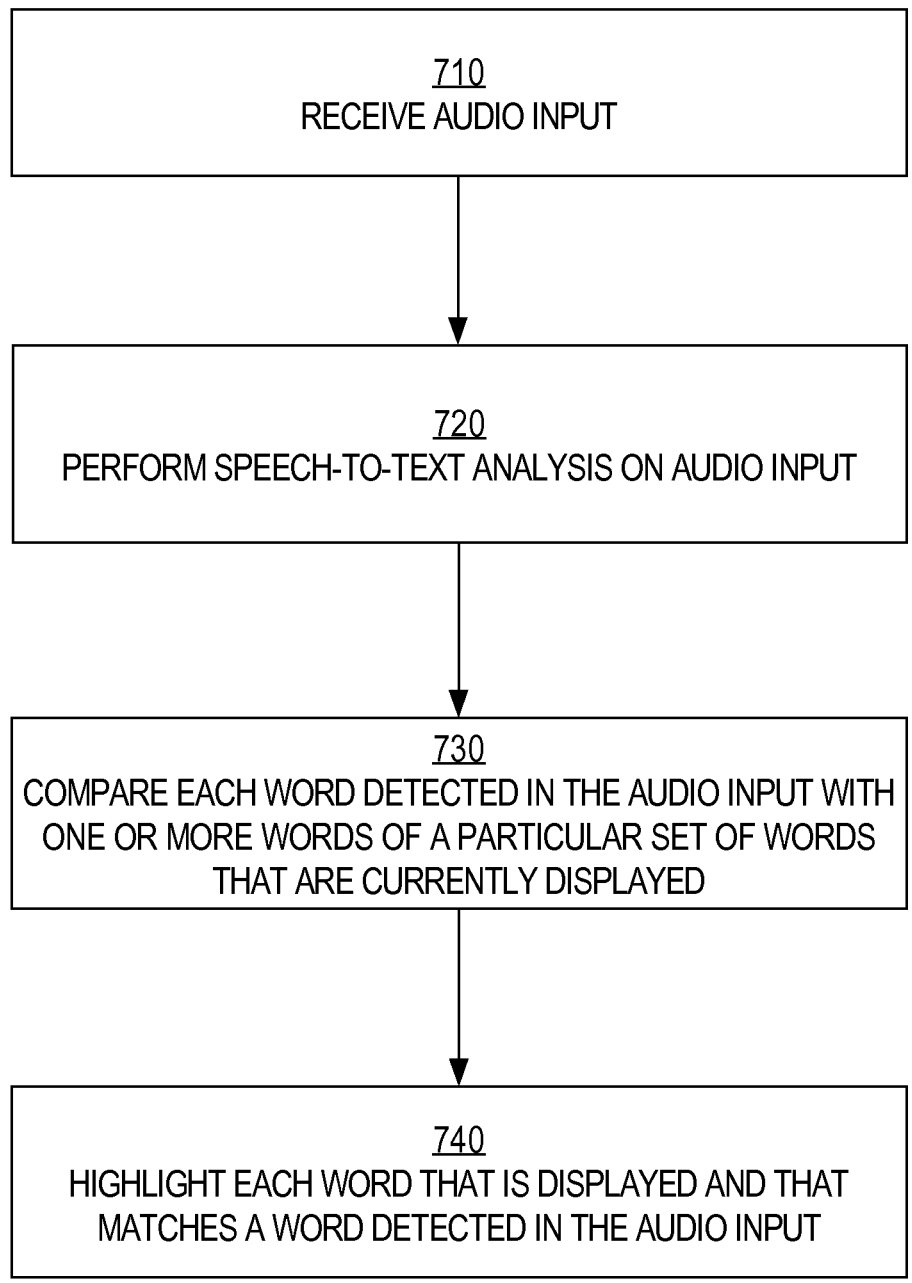
FIG. 7 is a flow diagram that depicts a process of highlighting displayed text in response to audio input from a user, according to an embodiment of the invention.

FIG. 7 is a flow diagram that depicts a process 700 of highlighting displayed text in response to audio input from a user, according to an embodiment of the invention. In this embodiment, a mapping is not required. The audio input is used to highlight text in a portion of a textual version of a work that is concurrently displayed to the user.

At step 710, audio input is received. The audio input may be based on a user reading aloud text from a textual version of a work. The audio input may be received by a device that displays a portion of the textual version. The device may prompt the user to read aloud a word, phrase, or entire sentence. The prompt may be visual or audio. As an example of a visual prompt, the device may cause the following text to be displayed: "Please read the underlined text" while or immediately before the device displays a sentence that is underlined. As an example of an audio prompt, the device may cause a computer-generated voice to read "Please read the underlined text" or cause a pre-recorded human voice to be played, where the pre-recorded human voice provides the same instruction.

At step 720, a speech-to-text analysis is performed on the audio input to detect one or more words reflected in the audio input.

At step 730, for each detected word reflected in the audio input, that detected word is compared to a particular set of words. The particular set of words may be all the words that are currently displayed by a computing device (e.g., an e-reader). Alternatively, the particular set of words may be all the words that the user was prompted to read.

At step 740, for each detected word that matches a word in the particular set, the device causes that matching word to be highlighted.

The steps depicted in process 700 may be performed by a single computing device that displays text from a textual version of a work. Alternatively, the steps depicted in process 700 may be performed by one or more computing devices that are different than the computing device that displays text from the textual version. For example, the audio input from a user in step 710 may be sent from the user's device over a network to a network server that performs the speech-to-text analysis. The network server may then send highlight data to the user's device to cause the user's device to highlight the appropriate text.

Playing Audio in Response to Text Selection

In an embodiment, a user of a media player that displays portions of a textual version of a work may select portions of displayed text and cause the corresponding audio to be played. For example, if a displayed word from the digital book is "donut" and the user selects that word (e.g., by touching a portion of the media player's touch screen that displays that word), then the audio of "donut" may be played.

A mapping that maps text locations in a textual version of the work with audio locations in audio data is used to identify the portion of the audio data that corresponds to the selected text. The user may select a single word, a phrase, or even one or more sentences. In response to input that selects a portion of the displayed text, the media player may identify one or more text locations. For example, the media player may identify a single text location that corresponds to the selected portion, even if the selected portion comprises multiple lines or sentences. The identified text location may correspond to the beginning of the selected portion. As another example, the media player may identify a first text location that corresponds to the beginning of the selected portion and a second text location that corresponds to the ending of the selected portion.

The media player uses the identified text location to look up a mapping record in the mapping that indicates a text location that is closest (or closest prior) to the identified text location. The media player uses the audio location indicated in the mapping record to identify where, in the audio data, to begin processing the audio data in order to generate audio. If only a single text location is identified, then only the word or sounds at or near the audio location may be played. Thus, after the word or sounds are played, the media player ceases to play any more audio. Alternatively, the media player begins playing at or near the audio location and does not cease playing the audio that follows the audio location until (a) the end of the audio data is reached, (b) further input from the user (e.g., selection of a "stop" button), or (c) a pre-designated stopping point in the audio data (e.g., end of a page or chapter that requires further input to proceed).

If the media player identifies two text locations based on the selected portion, then two audio locations are identified and may be used to identify where to begin playing and where to stop playing the corresponding audio.

In an embodiment, the audio data identified by the audio location may be played slowly (i.e., at a slow playback speed) or continuously without advancing the current playback position in the audio data. For example, if a user of a tablet computer selects the displayed word "two" by touching a touch screen of the tablet computer with his finger and continuously touches the displayed word (i.e., without lifting his finger and without moving his finger to another displayed word), then the tablet computer plays the corresponding audio creating a sound reflected by reading the word "twoooooooooooooooooo".

In a similar embodiment, the speed at which a user drags her finger across displayed text on a touch screen of a media player causes the corresponding audio to be played at the same or similar speed. For example, a user selects the letter "d" of the displayed word "donut" and then slowly moves his finger across the displayed word. In response to this input, the media player identifies the corresponding audio data (using the mapping) and plays the corresponding audio at the same speed at which the user moves his finger. Therefore, the media player creates audio that sounds as if the reader of the text of the textual version of the work pronounced the word "donut" as "dooooooonnnnnn-uuuuuut."

In a similar embodiment, the time that a user "touches" a word displayed on a touch screen dictates how quickly or slowly the audio version of the word is played. For example, a quick tap of a displayed word by the user's finger causes the corresponding audio to be played at a normal speed, whereas the user holding down his finger on the selected word for more than 1 second causes the corresponding audio to be played at ½ the normal speed.

Transferring User Annotations

In an embodiment, a user initiates the creation of annotations to one media version (e.g., audio) of a digital work and causes the annotations to be associated with another media version (e.g., text) of the digital work. Thus, while an annotation may be created in the context of one type of media, the annotation may be consumed in the context of another type of media. The "context" in which an annotation is created or consumed refers to whether text is being displayed or audio is being played when the creation or consumption occurs.

Although the following examples involve determining a location within audio or text location when an annotation is created, some embodiments of the invention are not so limited. For example, the current playback position within an audio file when an annotation is created in the audio context is not used when consuming the annotation in the text context. Instead, an indication of the annotation may be displayed, by a device, at the beginning or the end of the corresponding textual version or on each "page" of the corresponding textual version. As another example, the text that is displayed when an annotation is created in the text context is not used when consuming the annotation in the audio context. Instead, an indication of the annotation may be displayed, by a device, at the beginning or end of the corresponding audio version or continuously while the corresponding audio version is being played. Additionally or alternatively to a visual indication, an audio indication of the annotation may be played. For example, a "beep" is played simultaneously with the audio track in such a way that both the beep and the audio track can be heard.

Figure 8A:
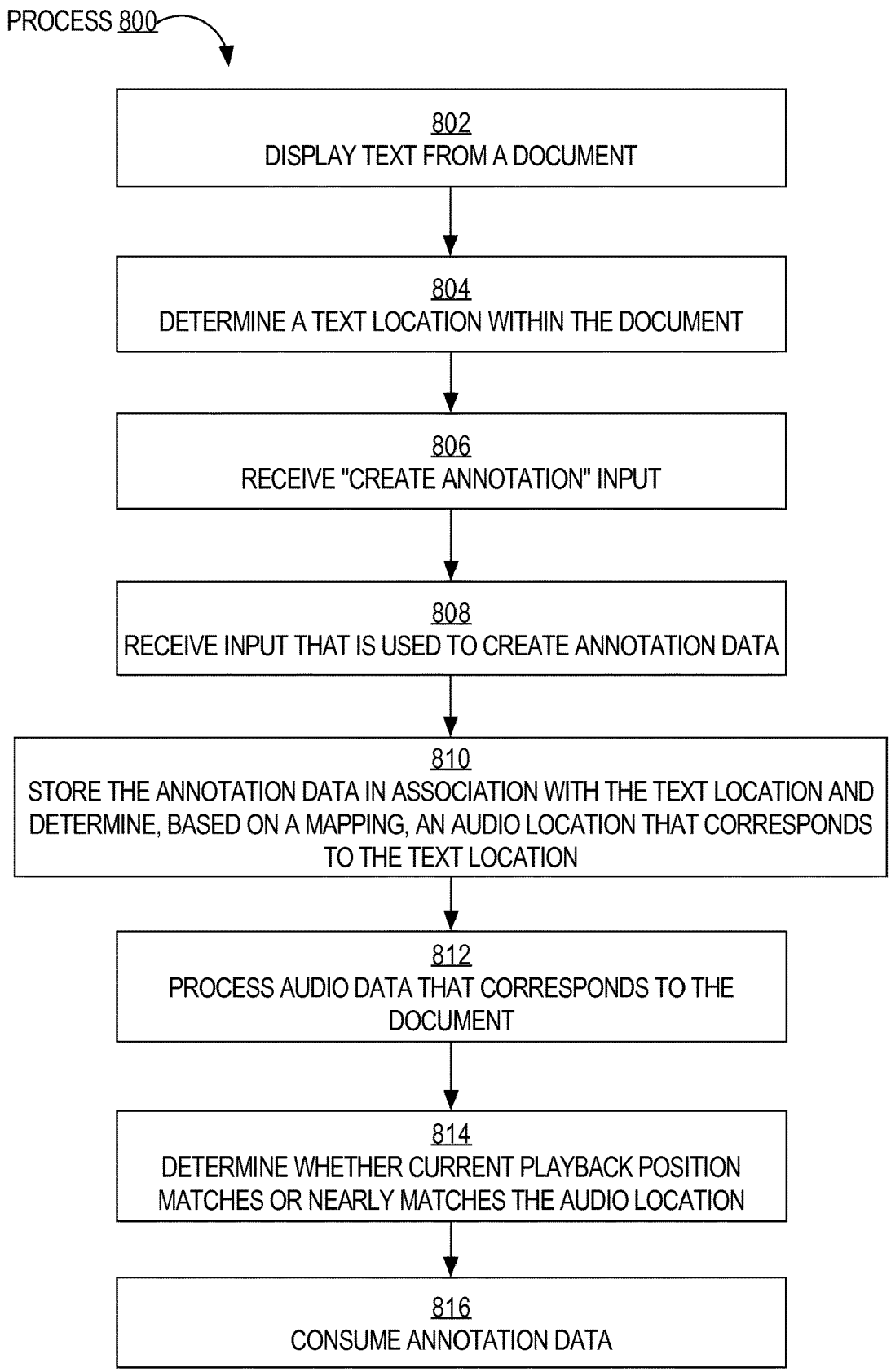
FIGS. 8A-B are flow diagrams that depict processes for transferring an annotation from one media context to another, according to an embodiment of the invention.
Figure 8B:
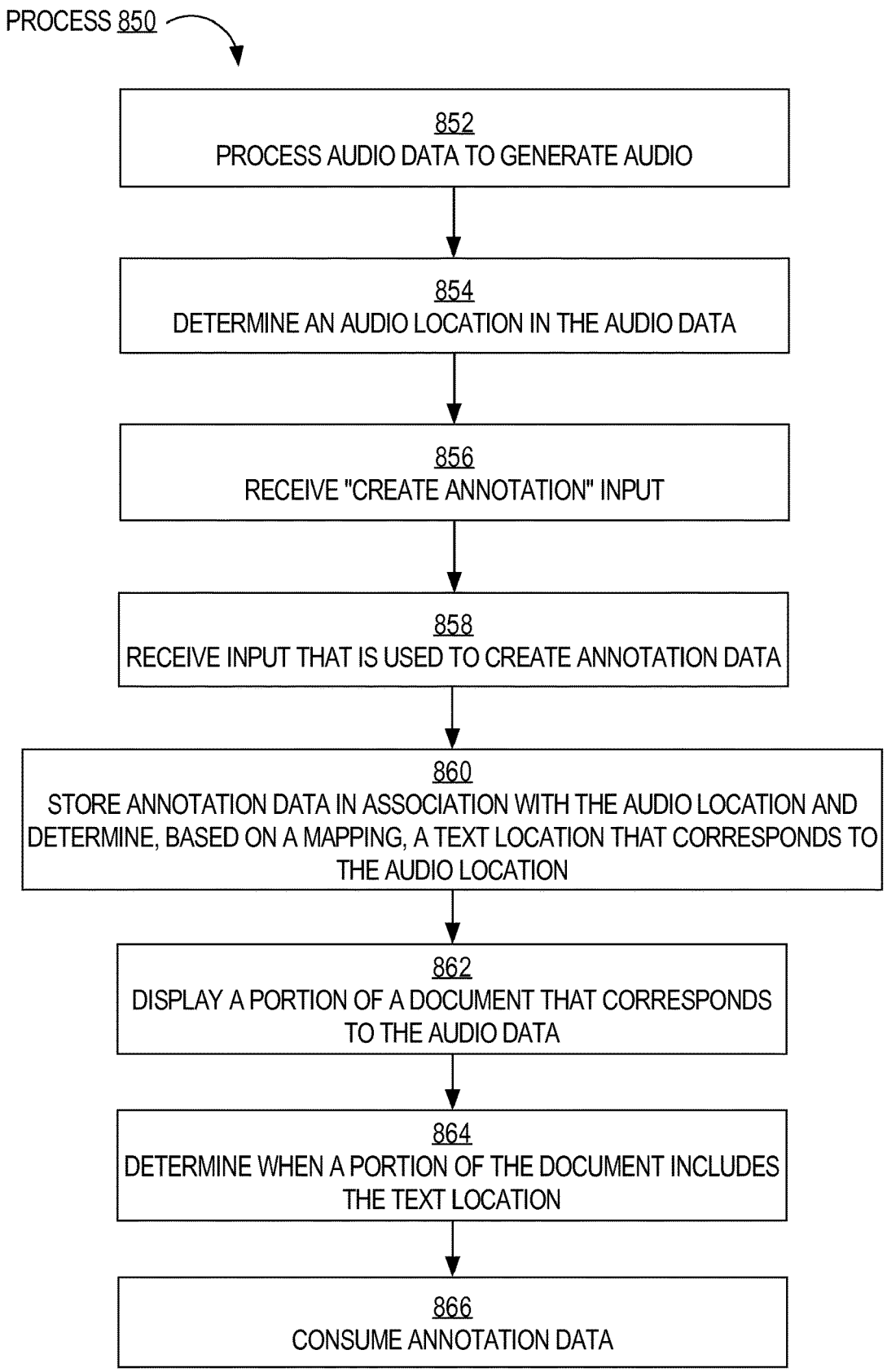

FIGS. 8A-B are flow diagrams that depict processes for transferring an annotation from one context to another, according to an embodiment of the invention. Specifically, FIG. 8A is a flow diagram depicts a process 800 for creating an annotation in the "text" context and consuming the annotation in the "audio" context, while FIG. 8B is a flow diagram that depicts a process 850 for creating an annotation in the "audio" context and consuming the annotation in the "text" context. The creation and consumption of an annotation may occur on the same computing device (e.g., device 410) or on separate computing devices (e.g., devices 410 and 430). FIG. 8A describes a scenario where the annotation is created and consumed on device 410 while FIG. 8B describes a scenario where the annotation is created on device 410 and later consumed on device 430.

At step 802 in FIG. 8A, text media player 412, executing on device 410, causes text (e.g., in the form of a page) from digital media item 402 to be displayed.

At step 804, text media player 412 determines a text location within a textual version of the work reflected in digital media item 402. The text location is eventually stored in association with an annotation. The text location may be determined in a number of ways. For example, text media player 412 may receive input that selects the text location within the displayed text. The input may be a user touching a touch screen (that displays the text) of device 410 for a period of time. The input may select a specific word, a number of words, the beginning or ending of a page, before or after a sentence, etc. The input may also include first selecting a button, which causes text media player 412 to change to a "create annotation" mode where an annotation may be created and associated with the text location.

As another example of determining a text location, text media player 412 determines the text location automatically (without user input) based on which portion of the textual version of the work (reflected in digital media item 402) is being displayed. For example, if device 410 is displaying page 20 of the textual version of the work, then the annotation will be associated with page 20.

At step 806, text media player 412 receives input that selects a "Create Annotation" button that may be displayed on the touch screen. Such a button may be displayed in response to input in step 804 that selects the text location, where, for example, the user touches the touch screen for a period of time, such as one second.

Although step 804 is depicted as occurring before step 806, alternatively, the selection of the "Create Annotation" button may occur prior to the determination of the text location.

At step 808, text media player 412 receives input that is used to create annotation data. The input may be voice data (such as the user speaking into a microphone of device 410) or text data (such as the user selecting keys on a keyboard, whether physical or graphical). If the annotation data is voice data, text media player 412 (or another process) may perform speech-to-text analysis on the voice data to create a textual version of the voice data.

At step 810, text media player 412 stores the annotation data in association with the text location. Text media player 412 uses a mapping (e.g., a copy of mapping 406) to identify a particular text location, in mapping, that is closest to the text location. Then, using mapping, text media player identifies an audio location that corresponds to the particular text location.

Alternatively to step 810, text media player 412 sends, over network 440 to intermediary device 420, the annotation data and the text location. In response, intermediary device 420 stores the annotation data in association with the text location. Intermediary device 420 uses a mapping (e.g., mapping 406) to identify a particular text location, in mapping 406, that is closest to the text location. Then, using mapping 406, intermediary device 420 identifies an audio location that corresponds to the particular text location. Intermediary device 420 sends the identified audio location over network 440 to device 410. Intermediary device 420 may send the identified audio location in response to a request, from device 410, for certain audio data and/or for annotations associated with certain audio data. For example, in response to a request for an audio book version of "The Tale of Two Cities", intermediary device 420 determines whether there is any annotation data associated with that audio book and, if so, sends the annotation data to device 410.

Step 810 may also comprise storing date and/or time information that indicates when the annotation was created. This information may be displayed later when the annotation is consumed in the audio context.

At step 812, audio media player 414 plays audio by processing audio data of digital media item 404, which, in this example (although not shown), may be stored on device 410 or may be streamed to device 410 from intermediary device 420 over network 440.

At step 814, audio media player 414 determines when the current playback position in the audio data matches or nearly matches the audio location identified in step 810 using mapping 406. Alternatively, audio media player 414 may cause data that indicates that an annotation is available to be displayed, regardless of where the current playback position is located and without having to play any audio, as indicated in step 812. In other words, step 812 is unnecessary. For example, a user may launch audio media player 414 and cause audio media player 414 to load the audio data of digital media item 404. Audio media player 414 determines that annotation data is associated with the audio data. Audio media player 414 causes information about the audio data (e.g., title, artist, genre, length, etc.) to be displayed without generating any audio associated with the audio data. The information may include a reference to the annotation data and information about a location within the audio data that is associated with the annotation data, where the location corresponds to the audio location identified in step 810.

At step 816, audio media player 414 consumes the annotation data. If the annotation data is voice data, then consuming the annotation data may involve processing the voice data to generate audio or converting the voice data to text data and displaying the text data. If the annotation data is text data, then consuming the annotation data may involve displaying the text data, for example, in a side panel of a GUI that displays attributes of the audio data that is played or in a new window that appears separate from the GUI. Non-limiting examples of attributes include time length of the audio data, the current playback position, which may indicate an absolute location within the audio data (e.g., a time offset) or a relative position within the audio data (e.g., chapter or section number), a waveform of the audio data, and title of the digital work.

FIG. 8B describes a scenario, as noted previously, where an annotation is created on device 430 and later consumed on device 410.

At step 852, audio media player 432 processes audio data from digital media item 404 to play audio.

At step 854, audio media player 432 determines an audio location within the audio data. The audio location is eventually stored in association with an annotation. The audio location may be determined in a number of ways. For example, audio media player 432 may receive input that selects the audio location within the audio data. The input may be a user touching a touch screen (that displays attributes of the audio data) of device 430 for a period of time. The input may select an absolute position within a timeline that reflects the length of the audio data or a relative position within the audio data, such as a chapter number and a paragraph number. The input may also comprise first selecting a button, which causes audio media player 432 to change to a "create annotation" mode where an annotation may be created and associated with the audio location.

As another example of determining an audio location, audio media player 432 determines the audio location automatically (without user input) based on which portion of the audio data is being processed. For example, if audio media player 432 is processing a portion of the audio data that corresponds to chapter 20 of a digital work reflected in digital media item 404, then audio media player 432 determines that the audio location is at least be somewhere within chapter 20.

At step 856, audio media player 432 receives input that selects a "Create Annotation" button that may be displayed on the touch screen of device 430. Such a button may be displayed in response to input in step 854 that selects the audio location, where, for example, the user touches the touch screen continuously for a period of time, such as one second.

Although step 854 is depicted as occurring before step 856, alternatively, the selection of the "Create Annotation" button may occur prior to the determination of the audio location.

At step 858, the first media player receives input that is used to create annotation data, similar to step 808.

At step 860, audio media player 432 stores the annotation data in association with the audio location. Audio media player 432 uses a mapping (e.g., mapping 406) to identify a particular audio location, in the mapping, that is closest to the audio location determined in step 854. Then, using the mapping, audio media player 432 identifies a text location that corresponds to the particular audio location.

Alternatively to step 860, audio media player 432 sends, over network 400 to intermediary device 420, the annotation data and the audio location. In response, intermediary device 420 stores the annotation data in association with the audio location. Intermediary device 420 uses mapping 406 to identify a particular audio location, in the mapping, that is closest to the audio location determined in step 854. Then, using mapping 406, intermediary device 420 identifies a text location that corresponds to the particular audio location. Intermediary device 420 sends the identified text location over network 440 to device 410. Intermediary device 420 may send the identified text location in response to a request, from device 410, for certain text data and/or for annotations associated with certain text data. For example, in response to a request for a digital book of "The Grapes of Wrath", intermediary device 420 determines whether there is any annotation data associated with that digital book and, if so, sends the annotation data to device 430.

Step 860 may also comprise storing date and/or time information that indicates when the annotation was created. This information may be displayed later when the annotation is consumed in the text context.

At step 862, device 410 displays text data associated with digital media item 402, which is a textual version of digital media item 404. Device 410 displays the text data of digital media item 402 based on a locally-stored copy of digital media item 402 or, if a locally-stored copy does not exist, may display the text data while the text data is streamed from intermediary device 420.

At step 864, device 410 determines when a portion of the textual version of the work (reflected in digital media item 402) that includes the text location (identified in step 860) is displayed. Alternatively, device 410 may display data that indicates that an annotation is available regardless of what portion of the textual version of the work, if any, is displayed.

At step 866, text media player 412 consumes the annotation data. If the annotation data is voice data, then consuming the annotation data may comprise playing the voice data or converting the voice data to text data and displaying the text data. If the annotation data is text data, then consuming the annotation data may comprises displaying the text data, for example, in a side panel of a GUI that displays a portion of the textual version of the work or in a new window that appears separate from the GUI.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
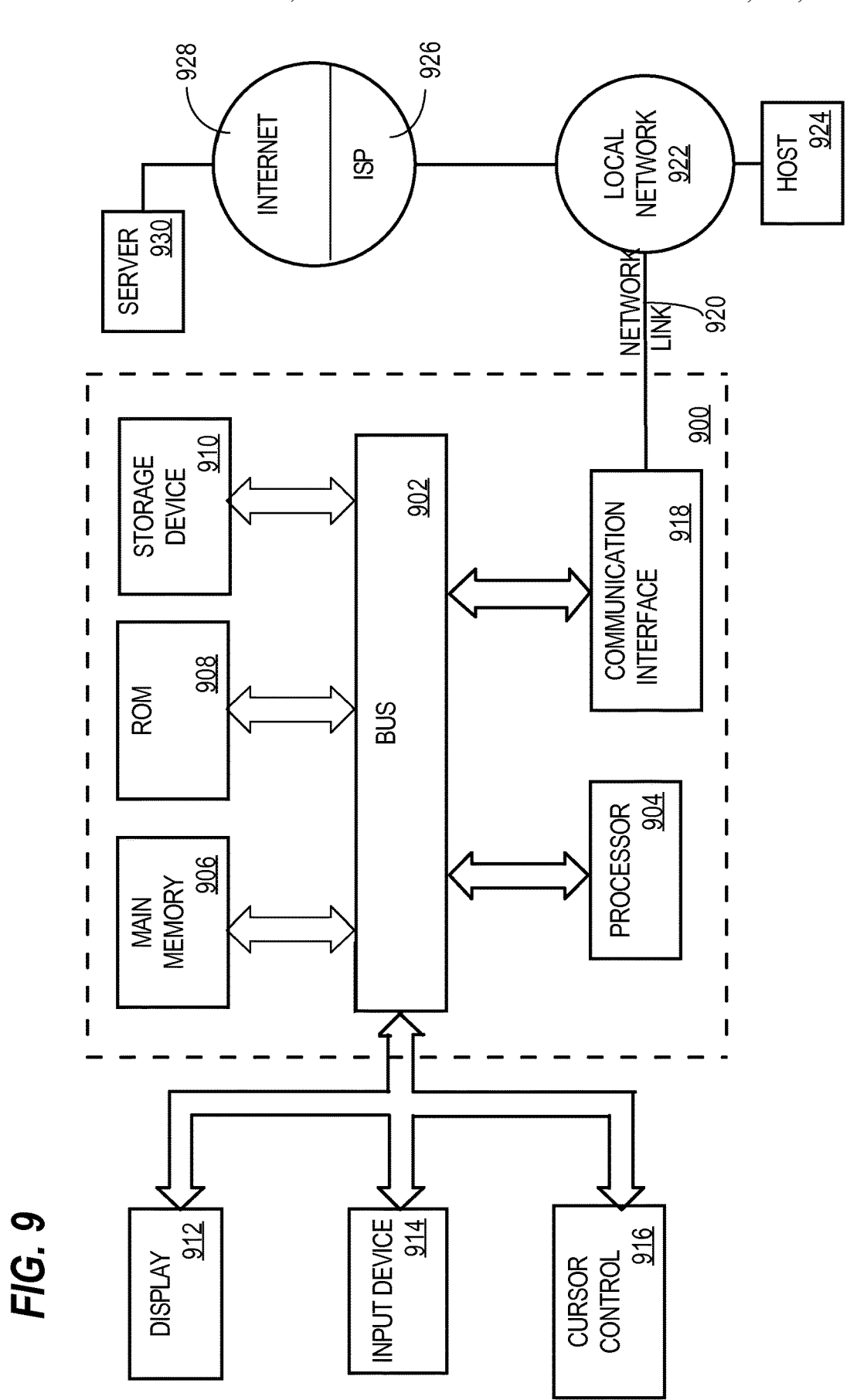
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    obtaining an annotation that comprises text data or voice data input from a user;
    storing an association between the annotation and a specified location within a textual version of a work;
    inspecting a mapping between a plurality of audio locations in an audio version of the work and a corresponding plurality of text locations in the textual version of the work, wherein the mapping is based on an audio-to-text analysis of the audio version of the work, to:
        determine a particular text location, of the plurality of text locations, that corresponds to the specified location, and
        based on the particular text location, determine a particular audio location, of the plurality of audio locations, that corresponds to the particular text location;
    providing the annotation and the particular audio location to a media player to cause the media player to display or play the annotation during playback of the audio version of the work at a particular time based on the particular audio location;
    wherein the method is performed by one or more computing devices.

2. The method of claim 1, wherein:
    obtaining further comprises a server receiving, over a network, the specified location from a first device;
    inspecting and providing are performed by the server; and
    providing comprises the server sending the particular audio location to a second device that executes the media player.

3. The method of claim 2, wherein the second device and the first device are the same device.

4. The method of claim 1 wherein obtaining, inspecting, and providing are performed by a computing device that is configured to display the textual version of the work and that executes the media player.

5. The method of claim 1, further comprising determining, at a device that is configured to display the textual version of the work, the specified location without input from a user of the device.

6. The method of claim 1, further comprising:
    receiving input from a user; and
    in response to receiving the input, determining the specified location based on the input.

7. The method of claim 6, wherein:
    providing the particular audio location to the media player comprises providing the particular audio location to the media player to cause the media player to process the audio data beginning at a current playback position, which causes the media player to generate audio from the processed audio data; and
    causing the media player to process the audio data is performed in response to receiving the input.

8. The method of claim 7, wherein:
    the input selects multiple words in the textual version of the work;
    the specified location is a first specified location;
    obtaining further comprises obtaining a second specified location, within the textual version of the work, that is different than the first specified location;
    inspecting further comprises inspecting the mapping to:
        determine a second particular text location, of the plurality of text locations, that corresponds to the second specified location, and
        based on the second particular text location, determine a second particular audio location, of the plurality of audio locations, that corresponds to the second particular text location; and
    providing the particular audio location to the media player comprises providing the second particular audio location to the media player to cause the media player to cease processing the audio data when the current playback position arrives at or near the second particular audio location.

9. One or more storage media storing instructions which, when executed by one or more processors, causes performance of the method recited in claim 1.

10. One or more storage media storing instructions which, when executed by one or more processors, causes performance of the method recited in claim 2.

11. One or more storage media storing instructions which, when executed by one or more processors, causes performance of the method recited in claim 3.

12. One or more storage media storing instructions which, when executed by one or more processors, causes performance of the method recited in claim 4.

13. One or more storage media storing instructions which, when executed by one or more processors, causes performance of the method recited in claim 5.

14. One or more storage media storing instructions which, when executed by one or more processors, causes performance of the method recited in claim 6.

15. One or more storage media storing instructions which, when executed by one or more processors, causes performance of the method recited in claim 7.

16. One or more storage media storing instructions which, when executed by one or more processors, causes performance of the method recited in claim 8.

* * * * *